United States Patent
Kitada

(10) Patent No.: US 12,032,982 B2
(45) Date of Patent: Jul. 9, 2024

(54) METHOD FOR DETERMINING CONTAINER TO BE MIGRATED AND NON-TRANSITORY COMPUTER-READABLE MEDIUM

(71) Applicant: FUJITSU LIMITED, Kawasaki (JP)

(72) Inventor: Atsushi Kitada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 783 days.

(21) Appl. No.: 17/129,406

(22) Filed: Dec. 21, 2020

(65) Prior Publication Data

US 2021/0279089 A1 Sep. 9, 2021

(30) Foreign Application Priority Data

Mar. 4, 2020 (JP) .................................. 2020-036593

(51) Int. Cl.
   *G06F 9/455* (2018.01)
(52) U.S. Cl.
   CPC .. *G06F 9/45558* (2013.01); *G06F 2009/4557* (2013.01); *G06F 2009/45595* (2013.01)
(58) Field of Classification Search
   CPC ......... G06F 9/45558; G06F 2009/4557; G06F 2009/45595
   See application file for complete search history.

(56) References Cited

U.S. PATENT DOCUMENTS

| | | | |
|---|---|---|---|
| 2010/0005465 A1 | 1/2010 | Kawato | |
| 2015/0007177 A1 | 1/2015 | Tobo et al. | |
| 2015/0350055 A1* | 12/2015 | Hyser | G06F 9/45558 709/224 |
| 2016/0217050 A1* | 7/2016 | Grimm | G06F 11/203 |
| 2018/0365055 A1* | 12/2018 | Bhimani | G06F 9/5033 |
| 2020/0183722 A1* | 6/2020 | Kumar | G06F 9/45558 |

FOREIGN PATENT DOCUMENTS

| JP | 2012-208541 A | 10/2012 |
|---|---|---|
| JP | 2015-007942 A | 1/2015 |
| JP | 2015-152984 A | 8/2015 |
| JP | 2017-033117 | 2/2017 |

(Continued)

OTHER PUBLICATIONS

EPOA—Communication Pursuant to Article 94(3) EPC issued on Jan. 4, 2023 for European Patent Application No. 20215464.7.

(Continued)

*Primary Examiner* — Jacob D Dascomb
(74) *Attorney, Agent, or Firm* — Fujitsu Intellectual Property Center

(57) ABSTRACT

A method for determining a container to be migrated is implemented by a first node executing a plurality of containers. The method includes determining a first container included in the plurality of the containers as the container to be migrated to a second node, and migrating the first container from the first node to the second node via a network. The plurality of containers in which a response time increases in a time zone in which a usage rate of a resource used by the first node increases, includes the first container and a second container each having an increase amount of a usage amount of the resource in the time zone and an increase amount of a data processing amount in the time zone that affects the increase in the response time.

10 Claims, 19 Drawing Sheets

(56) References Cited

FOREIGN PATENT DOCUMENTS

| JP | 2017-073045 A | 4/2017 |
|---|---|---|
| JP | 2017-091001 A | 5/2017 |
| JP | 2017-146791 | 8/2017 |
| WO | 2008/062864 A1 | 5/2008 |

OTHER PUBLICATIONS

European Office Action dated Mar. 30, 2022 for corresponding European Patent Application No. 20215464.7, 6 pages.
Anonymous: "Migration (virtualization)-Wikipedia", Feb. 26, 2020, pp. 1-2, XP055904861, Retrieved from the Internet: URL: https://en.wikipedia.org/w/index.php?title=Migration_(virtualization)&oldid=942802189 [retrieved on Mar. 24, 2022].
EESR—Extended European Search Report issued on May 26, 2021 in a counterpart European Patent Application No. 20215464.7.
Mukherjee Joydeep et al.: "Subscriber-Driven Interference Detection for Cloud-Based Web Services", IEEE Transactions on Network and Service Management, IEEE, US, vol. 14, No. 1, Mar. 1, 2017 (Mar. 1, 2017), pp. 48-62, XP011642617, ISSN: 1932-4537, DOI: 10.1109/TNSM .2016.2642838 [retrieved on Mar. 9, 2017].
Joshi Kartik et al.: "Sherlock: Lightweight Detection of Performance interference in Containerized Cloud Services", 2017 IEEE 19th International Conference on High Performance Computing and Communications; IEEE 15th International Conference on Smartcity; IEEE 3rd International Conference On Data Science and Systems ( HPCC/SMARTCITY/ DSS), I EEE, Dec. 18, 2017 (Dec. 18, 2017), pp. 522-530, XP033321765, DOI:10.1109/HPCC-SMARTCITY-DSS.2017.68.
Anonymous: "Rate ( mathematics)-Wikipedia", Mar. 3, 2020 (Mar. 3, 2020), pp. 1-4, XP055804614, Retrieved from the Internet: URL: https://en.wikipedia.org/w/i ndex.php? title=Rate_( mathematics) &oldid=943789447 [retrieved on May 17, 2021].
JPOA—Japanese Office Action (Notification of Reasons for Refusal) issued on Dec. 12, 2023 in a counterpart Japanese Patent Application No. 2020-036593, with full machine translation.

\* cited by examiner

METHOD FOR DETERMINING CONTAINER TO BE MIGRATED AND NON-TRANSITORY COMPUTER-READABLE MEDIUM

CROSS-REFERENCE TO RELATED APPLICATION

This application is based upon and claims the benefit of priority of the prior Japanese Patent Application No. 2020-036593 filed on Mar. 4, 2020, the entire contents of which are incorporated herein by reference.

FIELD

A certain aspect of the embodiments is related to a method for determining a container to be migrated and a non-transitory computer-readable medium.

BACKGROUND

VM (Virtual Machine) virtualization technology and container virtualization technology are known as technologies for virtualizing computers. Among these, the VM virtualization technology is a technology that performs virtualization by executing a guest OS (Operating System) on a host OS, and has large overhead for executing the guest OS.

On the other hand, the container virtualization technology is a technology that virtualizes a computer using only a part of a kernel of the guest OS. Since only the part of the kernel is used in this way, the container virtualization technology has an advantage that the overhead for virtualization is small and light compared with the VM virtualization technology. In the container virtualization technology, a plurality of user spaces are generated independent of each other. These user spaces are called containers, and an application program is executed in each of the containers. For example, there is DOCKER (registered trademark) as a container engine which is a program for generating the containers.

Since the container has small overhead for virtualization as described above, the container can be easily migrated between nodes. Therefore, it is possible to easily construct a system having excellent scalability by generating the container for each of the plurality of nodes.

However, in the system using the container in this way, there is room for improvement in terms of suppressing deterioration in performance of the container. Note that the technique related to the present disclosure is disclosed in Japanese Laid-open Patent Publications No. 2017-091001, No. 2015-152984 and No. 2017-073045.

SUMMARY

According to an aspect of the present disclosure, there is provided a method for determining a container to be migrated, the method is implemented to a first node executing a plurality of containers, the method including: determining a first container included in the plurality of the containers as the container to be migrated to a second node, wherein a response time of the first container increases in a time zone in which a usage rate of a resource used by the first node increases, and the first container includes a parameter that affects the increase in the response time, where the parameter does not exceed a predetermined value in the time zone.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Prior to the description of the present embodiment, matters studied by an inventor will be described.

Figure 1:
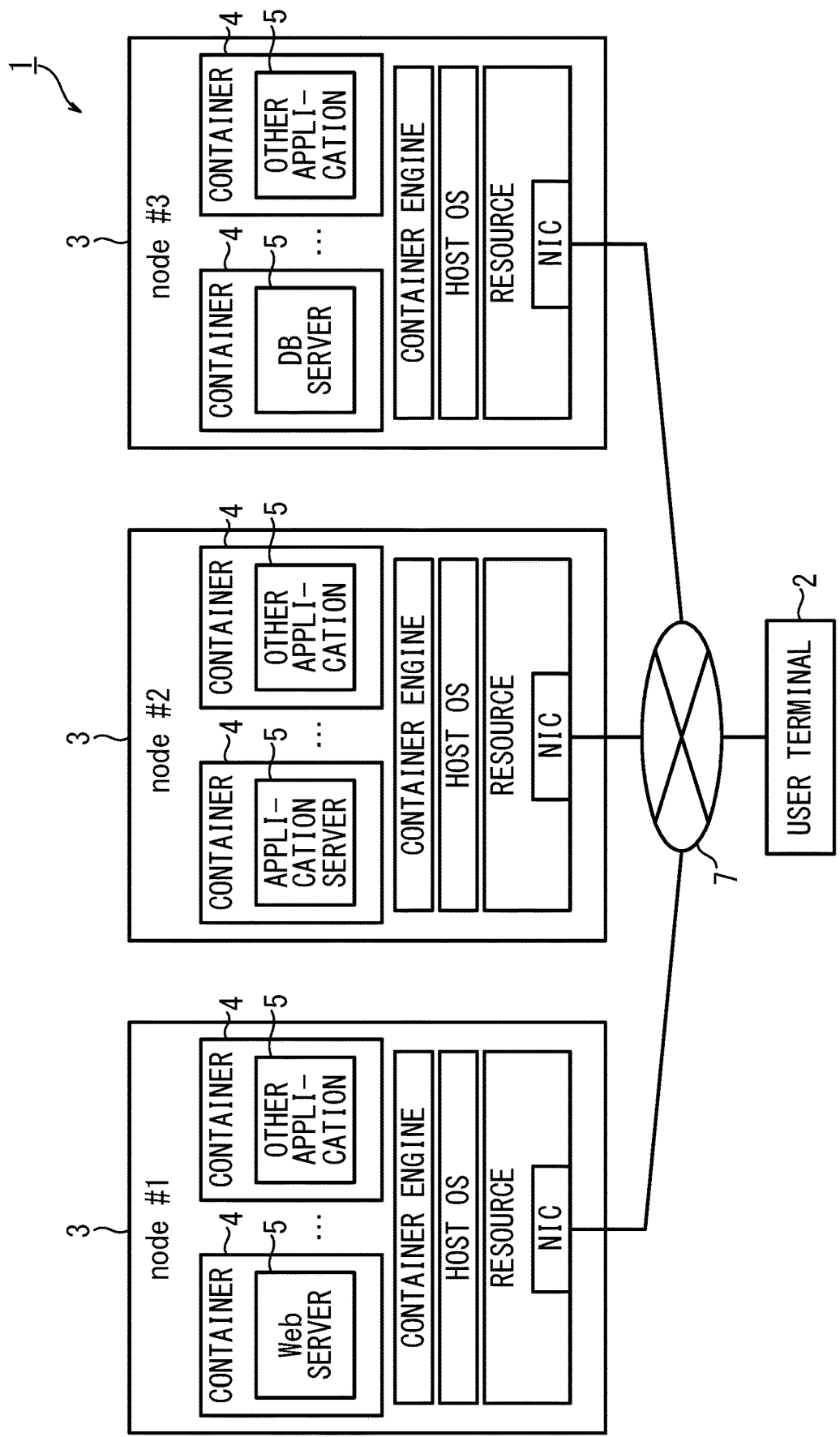
FIG. 1 is a diagram illustrating the configuration of a system used in the study.

FIG. 1 is a diagram illustrating the configuration of a system used in the study. A system 1 is a system for providing web service to a user terminal 2 such as a PC (Personal Computer), and includes a plurality of nodes 3. Each of the nodes 3 is a physical server, for example. In the following, each node 3 is identified by character strings "node #1", "node #2", and "node #3" for uniquely identifying each of the nodes 3.

Each node 3 has physical resources for executing a host OS. Such resources include, for example, a CPU (Central Processing Unit), a memory, a storage, and a NIC (Network Interface Card). Then, a container engine such as DOCKER (registered trademark) is executed on the host OS.

The container engine is a program for booting a plurality of containers 4 thereon. Then, inside the container 4, an application 5 which is an application program for performing various processes is executed.

Each of the nodes 3 is connected to a network 7 via a NIC, so that the nodes 3 can access each other. The network 7 is Internet, for example.

In this example, it is assumed that each of the nodes 3 cooperates to construct a three-layer architecture. In this case, the application 5 for realizing a web server is executed in the node 3 of "node #1". The application 5 for realizing an application server is executed in the node 3 of "node #2". Moreover, the application 5 for realizing a DO (Database) server is executed in the node 3 of "node #3".

In the case of such an architecture, the web server of "node #1" receives a service request from the user terminal 2. Then, the application server of "node #2" acquires data necessary for providing the service, from the DO server of "node #3". Further, the application server performs a predetermined processing on the data, and returns a result of the processing to the user terminal 2 via the web server of "node #1".

In this way, the architecture in which a plurality of applications S having different functions are combined to perform a single processing is called a microservice. In particular, since the container 4 that does not require a guest OS has a light load, migration between the nodes 3 can be easily executed in a short time, and the system for microservice having excellent scalability can be constructed. However, this system 1 has the following problem.

Figure 2:
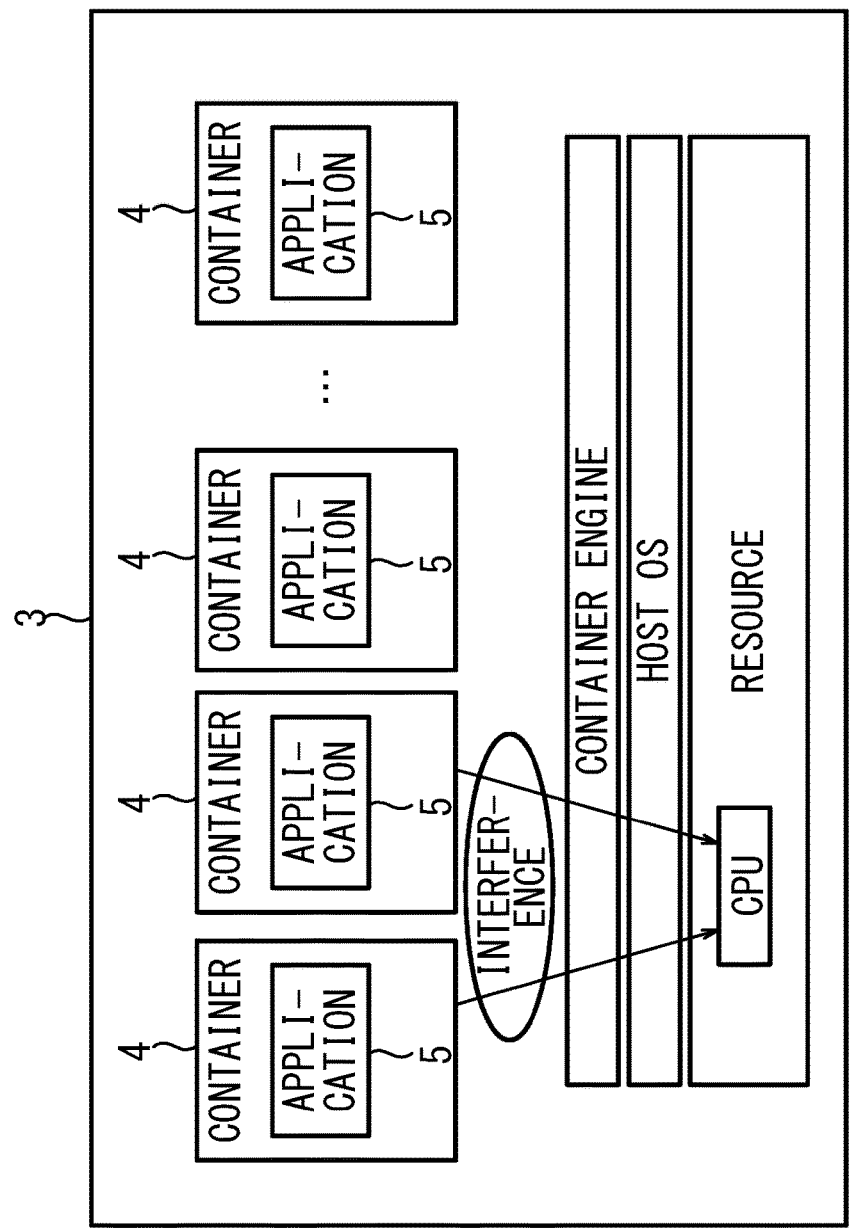
FIG. 2 is a schematic diagram of a node for explaining a problem.

FIG. 2 is a schematic diagram of the node 3 for explaining the problem. In VM virtualization technology, the virtualization software allocates exclusive resources to each of a plurality of VMs. For example, when a first VM is allocated to a first core of the CPU, a second VM is allocated to a second core of the CPU. This allows each of the VMs to exclusively use the resource allocated thereto.

On the other hand, in the container virtualization technology, the host OS has an authority to allocate the resources to the container 4, and the container engine does not have the authority. Therefore, as illustrated in FIG. 2, a single resource such as the CPU is allocated to the plurality of containers 4, and the plurality of containers 4 may share the single resource. In this case, since the plurality of containers 4 compete for the single resource, the containers 4 interfere with each other via the single resource, and the performance such us a response time of each container 4 deteriorates.

The resources include a CPU, a memory, and so on. Among the resources, the resource used to mediate the interference between the containers 4 depends on the characteristics of the application 5 executed in each container 4.

For example, the container 4 that executes the application 5 for the DB server tends to frequently access the storage in which the DB is stored. Therefore, the container 4 is likely to interfere with other containers 4 via the storage.

On the other hand, since the container 4 that executes the application 5 for the application server accesses the storage less frequently, it is less likely to interfere with other containers 4 through the storage.

Figure 3:
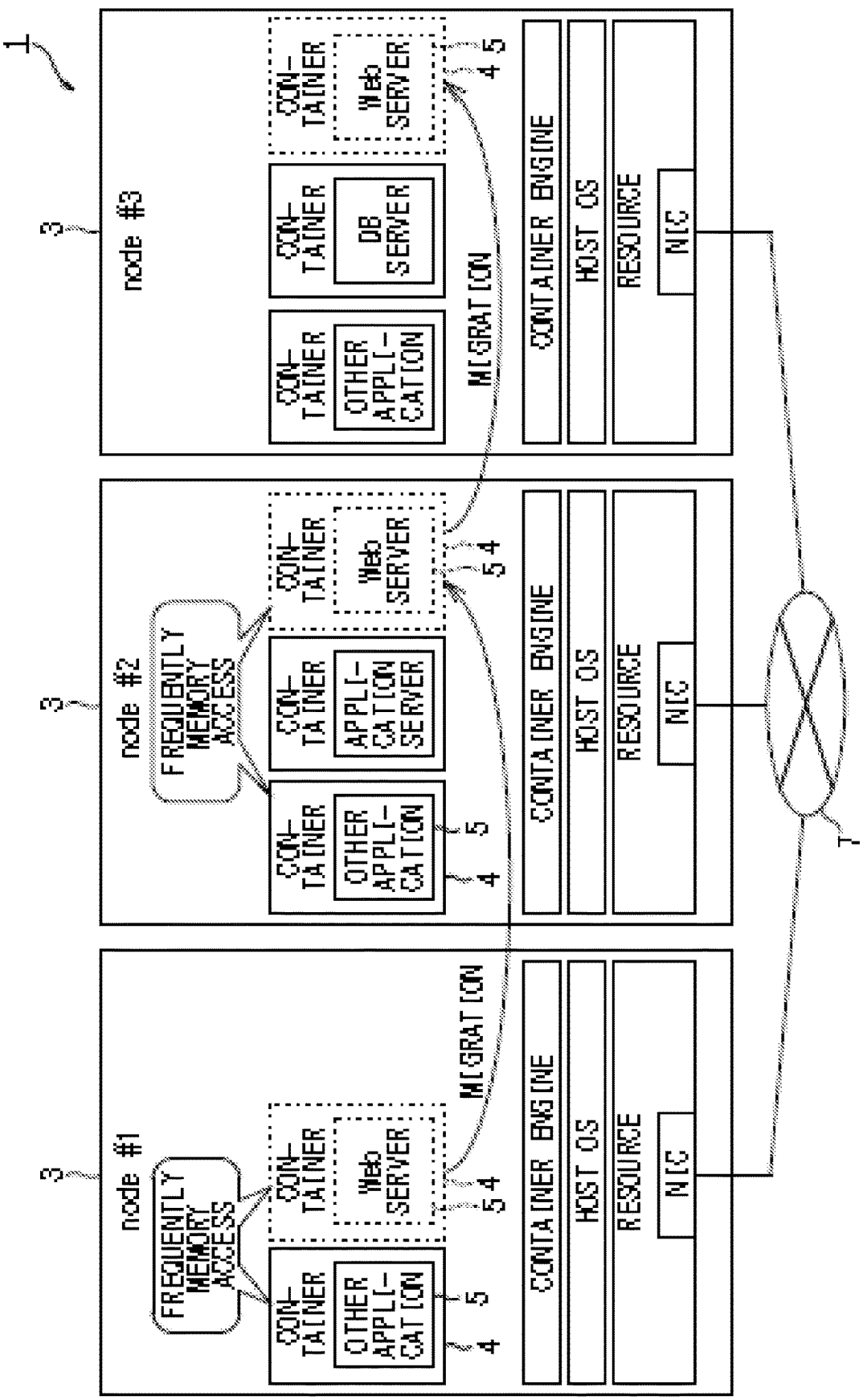
FIG. 3 is a schematic diagram illustrating a method of eliminating interference between containers.

FIG. 3 is a schematic diagram illustrating a method of eliminating interference between the containers 4.

When the plurality of containers 4 that interfere with each other via a certain resource are concentrated on the single node 3, at least one of the containers 4 may be migrated to the other node 3.

In an example of FIG. 3, it is assumed that the container 4 that executes the application 5 for the web server and the container 4 that executes other application 5 interfere with each other via the memory in the node 3 of "node #1". In this case, by migrating the container 4 that executes the application 5 for the web server from "node #1" to "node #2", the interference between the containers 4 in "node #1" can be eliminated.

However, in this example, in the destination "node 2", the container 4 that executes the application 5 for the web server interferes with the container 4 that executes the other application 5 via the memory again. Therefore, the container 4 that executes the application 5 for the web server must be further migrated from "node #2" to "node #3".

In this way, if the destination node 3 of the container 4 is randomly selected, the containers 4 interfere with each other even in the destination node 3.

In particular, in the microservice, the processing result of a certain container 4 is used by the other container 4, so that the service is realized. Therefore, when the performance of the single container 4 deteriorates as described above, the performance such as the response time of the service itself also deteriorates.

Here, it is considered to identify the container 4 that causes the interference and migrate the container 4 to the other node 3, as a method for avoiding the interference between the containers 4.

For example, in the example of FIG. 3, the other application 5 in "node #1" frequently accesses the memory, which cause the interference between the containers 4 via the memory. In this case, when the container 4 that executes the other application 5 of "node #1" is migrated to the node 3 of "node #2", the interference in "node #1" is eliminated. However, when the container 4 that causes the interference is migrated to "node #2" in this way, there is a possibility that the container 4 also causes the interference in "node #2". To avoid this, the container 4 that causes interference may be executed on a dedicated node 3, but this increases the cost of the system. Hereinafter, a description will be given of each embodiment that can suppress the deterioration in performance of the container.

First Embodiment

Figure 4:
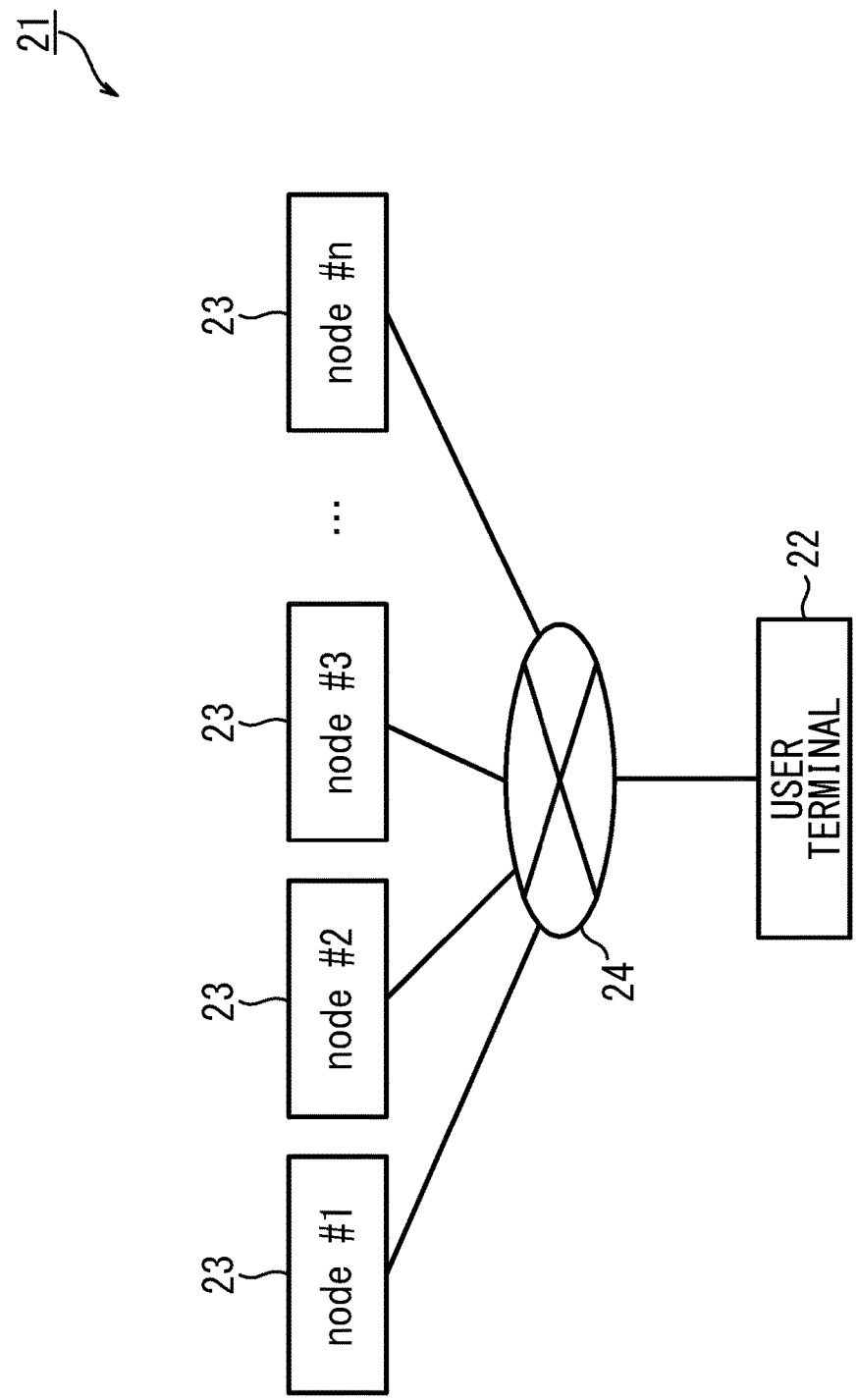
FIG. 4 is a diagram illustrating the system configuration of a system according to a first embodiment.

FIG. 4 is a diagram illustrating the system configuration of a system according to a first embodiment. A system 21 is a system for providing services to a user terminal 22 such as the PC, and includes a plurality of nodes 23. Each of the nodes 23 is a physical server, for example, and the nodes 3 are connected to each other via a network 24 such as the Internet. Here, each node 3 is identified by character strings "node #1", "node #2", . . . and "node #n" for uniquely identifying each of the nodes 3. Note that one of the nodes 3 is an example of the first node and remaining nodes are examples of the second nodes.

The system 21 may be constructed by using a cloud service provided by a cloud operator. In this case, physical servers in the data center of the cloud operator are the nodes 23.

Figure 5:
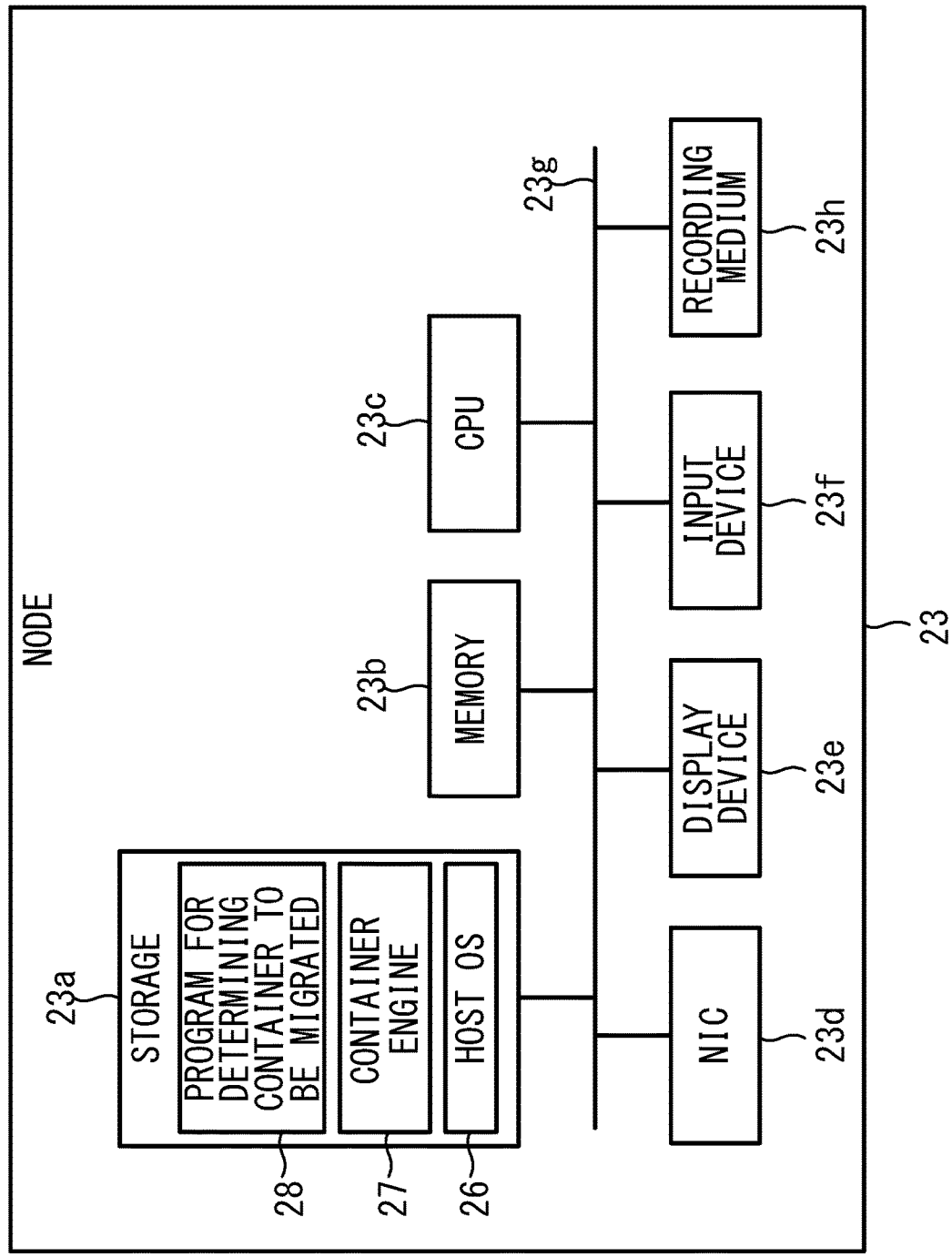
FIG. 5 is a diagram illustrating the hardware structure of a node according to the first embodiment.

FIG. 5 is a diagram illustrating the hardware structure of the node 23. As illustrated in FIG. 5, the node 23 includes a storage 23a, a memory 23b, a CPU 23c, a NIC 23d, a display device 23e, an input device 23f, and a recording medium 23h. These elements are connected to each other by a bus 23g.

The storage 23a is a non-volatile storage device such as an HDD (Hard Disk Drive) or an SSD (Solid State Drive).

In this example, the storage 23a stores a host OS 26, a container engine 27, and a program 28 for determining the container to be migrated (hereinafter, simply referred to as "determination program 28"). For example, the OS of each distribution of Linux (registered trademark) can be adopted as the host OS 26. The container engine 27 is the DOCKER (registered trademark), for example. Then, the determination program 28 is a program for migrating the container to the other node as described later.

The determination program 28 may be recorded on the computer-readable recording medium 23h, and the CPU 23c may read the determination program 28 from the recording medium 23h.

Examples of such a recording medium 23h include physically portable recording media such as a CD-ROM (Compact Disc-Read Only Memory), a DVD (Digital Versatile Disc), and a USB (Universal Serial Bus) memory. Further, a semiconductor memory such as a flash memory, or a hard disk drive may be used as the recording medium 23h. The recording medium 23h is not a temporary medium such as a carrier wave having no physical form.

Further, the determination program 28 may be stored in a device connected to a public line, the Internet, a LAN (Local Area Network), or the like. In this case, the CPU 23c may read and execute the determination program 28.

Meanwhile, the memory 23b is hardware that temporarily stores data, such as a DRAM, and the host OS 26, the container engine 27 and the determination program 28 are deployed on the memory 23b.

The CPU 23c is a processor that controls each element in the node 23. Further, the CPU 23c executes the host OS 26, the container engine 27 and the determination program 28 in cooperation with the memory 23b.

Further, the NIC 30d is a communication interface for connecting the node 23 to the network 24.

The display device 23e is hardware such as a liquid crystal display device, and displays various information to an administrator of the system 21. The input device 23f is hardware such as a keyboard and a mouse. For example, the administrator issues various instructions to the node 23 by operating the input device 23f.

Figure 6:
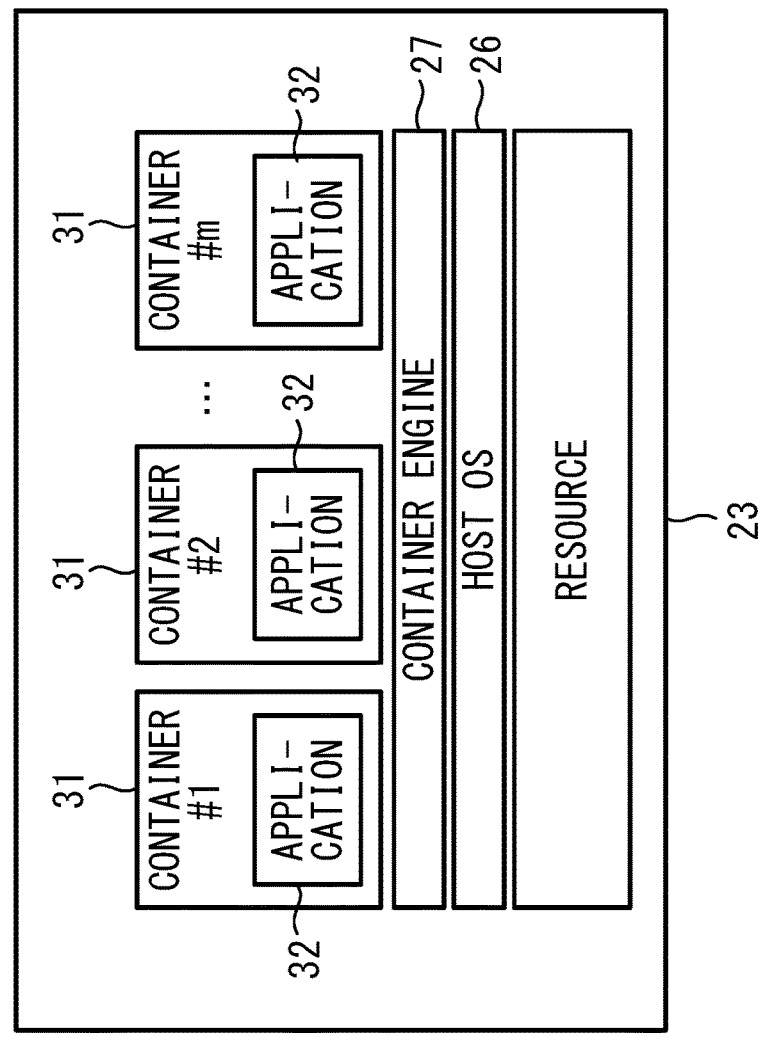
FIG. 6 is a schematic diagram of a single node according to the first embodiment.

FIG. 6 is a schematic diagram of the single node 23 according to the present embodiment. As illustrated in FIG. 6, in the node 23, the host OS 26 is executed on physical resources. The resources include the storage 23a, the memory 23b, the CPU 23c and the NIC 23d of FIG. 5.

The node 23 executes the container engine 27 on the host OS 26, so that the plurality of containers 31 are booted. Hereinafter, each container 31 is identified by character strings of "#1", "#2", . . . "#m". Further, a single application 32 is executed inside each container 31. The application 32 is an application program for executing the processing requited for the service provided by the system 21.

Similar to the example in FIG. 2, in the node 23, the containers 31 may interfere with each other via the resource. In the interfered container 31, the performance such as the response time deteriorates due to the occupation of the resource by the other container 31.

Hereinafter, the container 31 with the greatest deterioration in performance, among the plurality of containers 31 that interfere with each other via the resource, is called a container vulnerable to the interference via the resource. In the present embodiment, each node 23 determines the container 31 vulnerable to the interference as follows, and migrates the container 31 to the other node 23.

Figure 7:
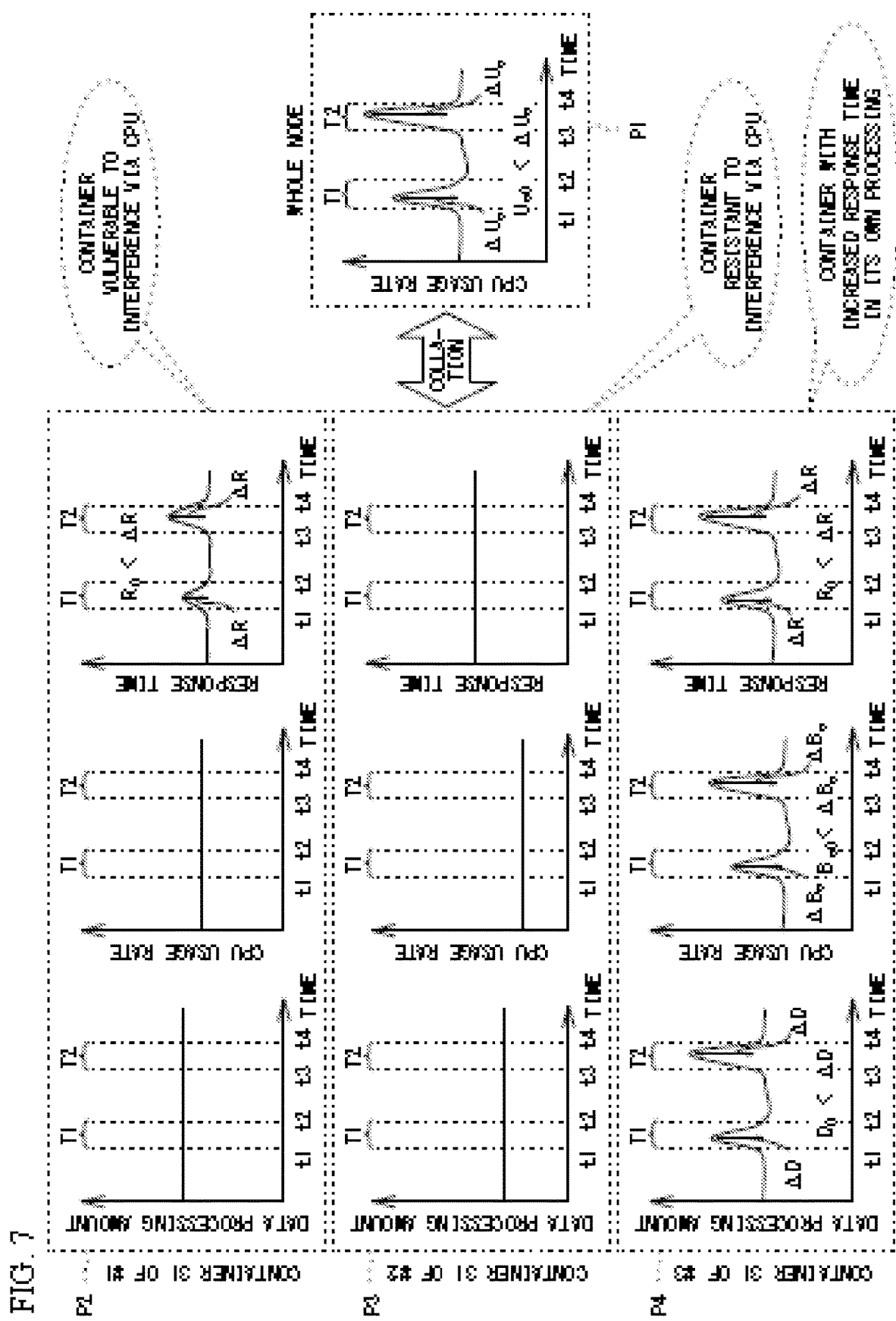
FIG. 7 is a schematic diagram illustrating a method of determining a container vulnerable to interference in the first embodiment.

FIG. 7 is a schematic diagram illustrating a method of determining the container 31 vulnerable to the interference in the present embodiment.

In this example, it is assumed that, when the resource mediating the interference between the containers 31 is the CPU 23c, the container 31 vulnerable to the interference is identified among the containers 31 of "#1", "#2" and "#3".

In this case, as illustrated in P1 of FIG. 7, attention is paid to a usage rate of the CPU 23c in the whole of the single node 23 executing the containers 31 of "#1", "#2" and "#3". The usage rate of the CPU 23c in the whole of the node 23 changes along with time according to an operating state of each container 31, and the like. In this example, the usage rate of the CPU 23c increases sharply in a time zone T1 from a time t1 to a time t2 and a time zone T2 from a time t3 to a time t4. In such a case, it is considered that any one of the containers 31 of "#1", "#2" and "#3" executes heavy processing in each of the time zone T1 and the time zone T2 by using the CPU 23c, thereby causing the increase of the usage rate of the CPU 23c.

In this case, in order to determine the container 31 vulnerable to the interference, a data processing amount of each container 31, the usage rate of the CPU 23c, and the response time are used in the present embodiment. The response time is a period from timing in which the process outside the container 31 requests the application 32 running in the container 31 to process to timing in which the result of the process is received. When the container 31 is interfered, the performance of the container 31 deteriorates and the response time increases. Therefore, the response time is an index for determining whether the performance of the container 31 deteriorated.

The data processing amount in a certain container 31 is defined as the number of bits of data processed by the container 31 in a unit time, for example. The usage rate of the CPU 23c by the certain container 31 is defined as a rate of an execution time of the container 31 occupying a processing time of the CPU 23c in the whole of the node 23.

Focusing on the container 31 of "#1" as illustrated in P2, the data processing amount of the container 31 of "#1" and the usage rate of the CPU 23c do not change in the time zone T1 and the time zone T2.

If the usage rate of CPU23c increases due to the container 31 of "#1" as illustrated in P1, at least one of the data processing amount of container 31 of "#1" and the usage rate of the CPU23c should increase in the time zone T1 and the time zone T2. However, if no such increase is observed, it can be estimated that the usage rate of the CPU 23c increased due to the container 31 different from the container 31 of "#1".

Focusing on the response time of container 31 in "#1", the response time increases in time zone T1 and time zone T2. Here, the amount of increase in the response time ΔR in a certain time zone is defined as a difference between a maximum value and a minimum value of the response time in the time zone.

Although the container 31 itself of "#1" does not perform heavy processing in each of the time zones T1 and T2, the increase amount ΔR in each of the time zones T1 and T2 is remarkable in this example, and the performance of the container 31 of "#1" is deteriorated. Therefore, it can be determined that the container 31 of "#1" is a container susceptible to the interference from the other container 31 via the CPU 23c.

Next, as illustrated in P3, the following description focuses on the container 31 of "2". As with container 31 of "#1", the data processing amount of the container 31 of "#2"

and the usage rate of the CPU 23c are not changed significantly. Therefore, it can be determined that the cause of the increase in the usage rate of the CPU 23c in each of the time zones T1 and T2 as illustrated in P1 is not the container 31 of "#2".

Further, in the container 31 of "#2", the response time is also unchanged in each of the time zones T1 and T2. Therefore, it can be determined that the container 31 in "#2" is a container in which the performance such as response time is unlikely to deteriorate even if the usage rate of the CPU 23c in the whole of the node increases, and the interference from the other container 31 via the CPU 23c is unlikely to occur.

Next, as illustrated in P4, the following description focuses on the container 31 of "#3". In the container 31 of "#3", the data processing amount and the usage rate of the CPU 23c increase in each of the time zones T1 and T2.

Here, an increase amount $\Delta D$ of the data processing amount of the container 31 in a certain time zone is defined as a difference between a maximum value and a minimum value of the data processing amount in the time zone. Similarly, an increase amount $\Delta B_c$ of the usage rate of the CPU 23c of the container 31 in a certain time zone is defined as a difference between a maximum value and a minimum value of the usage rate of the CPU 23c of the container 31 in the time zone.

In the container 31 of "#3", the increase amounts $\Delta D$ and $\Delta B_c$ are remarkable in each of the time zones T1 and T2. Therefore, it can be determined that the cause of the increase in the usage rate of the CPU 23c in each of the time zones T1 and T2 as illustrated in P1 is the container 31 of "#3".

Further, the response time of the container 31 of "#3" increases in each of the time zones T1 and T2. It can be determined that this is because the container 31 itself executes the heavy processing by using the CPU 23c, thereby deteriorating its performance.

From the above results, it can be determined that the container 31 of "#1" is the container vulnerable to the interference via the CPU 23c. Further, it can be determined that the container 31 of "#2" is the container resistant to the interference via the CPU 23c, and the container 31 of "#3" is the container causing the interference.

In order for the node 23 to determine the container 31 vulnerable to the interference, in the present embodiment, the node 23 determines whether the increase amount $\Delta R$ of the response time of the container 31 exceeds a predetermined value $R_o$, in the time zone T1. The predetermined value $R_o$ is a reference value for determining whether the container 31 is interfered with the other container, and is determined in advance in a test or the like.

When the increase amount $\Delta R$ exceeds the predetermined value $R_o$, the node 23 determines whether the increase amount $\Delta B_c$ of the usage rate of the CPU 23c in the container 31 exceeds a predetermined value $B_{C0}$ in the time zone T1. Further, the node 23 determines whether the increase amount $\Delta D$ of the data processing amount in the container 31 exceeds a predetermined value $D_0$ in the time zone T1. The respective increase amounts $\Delta B_c$ and $\Delta D$ are examples of parameters that affect the increase in the response time of the container 31. The predetermined values $B_{C0}$ and $D_0$ are reference values for determining whether the response time is increased due to these parameters, and they are predetermined in advance in the test or the like.

Here, it is assumed that the increase amount $\Delta D$ of the data processing amount of the container 31 does not exceed the predetermined value $D_0$ and the increase amount $\Delta B_c$ of the usage rate of the CPU 23c also does not exceed the predetermined value $B_{C0}$. In this case, the node 23 determines that the reason why the increase amount $\Delta R$ of the response time of the container 31 exceeds the predetermined value R0 is not in the container 31 itself, and the container 31 is interfered with the other container 31.

Further, in order to determine whether the resource mediating the interference of the container 31 is the CPU 23c, the node 23 determines whether the increase amount $\Delta U_c$ of the usage rate of the CPU 23c in the whole of its own node 23 in the time zone T1 exceeds a predetermined value $U_{c0}$. The increase amount $\Delta U_c$ of the usage rate is defined as a difference between a maximum value and a minimum value of the usage rate of the CPU 23c in the time zone T1. Further, the predetermined value $U_{c0}$ is a value for specifying that the resource mediating the interference between the containers 31 is the CPU 23c. Then, when the increase amount $\Delta U_c$ exceeds the predetermined value $U_{c0}$, the node 23 determines that the container 31 is the container vulnerable to the interference via the CPU 23c.

Although the description is given of the case where the resource that mediates the interference is the CPU 23c in this example, the container 31 vulnerable to the interference via the resource other than the CPU 23c can also be determined in the same manner. In this case, the node 23 may use predetermined values $B_{m0}$, $B_{s0}$, and $B_{n0}$ with respect to respective increase amounts $\Delta B_m$, $\Delta B_s$, and $\Delta B_u$ of the usage rates of the memory 23b, the storage 23a, and the NIC 23d used by the container 31. Each usage rate of the NIC 23d is defined as a usage rate of a bandwidth of the network connected to the NIC 23d. Then, the node 23 may use predetermined values $U_{m0}$, $U_{s0}$, and $U_{n0}$ with respect to the increase amounts $\Delta U_m$, $\Delta U_s$, and $\Delta U_n$ of the usage rates of the memory 23b, the storage 23a, and the NIC 23d in the whole of the node 23.

By the way, in order to eliminate the interference between the containers 31 in FIG. 7, it may be considered that the container 31 of "#3" which is a cause of the interference may be migrated to the other node 23. However, in this case, the container 31 of "#3" may interfere with the other container 31 again in the destination node 23.

Therefore, in the present embodiment, the container 31 of "#1" vulnerable to the interference among the containers 31 that interfere with each other is migrated to the other node 23. The container 31 of "#1" is not the container causing the interference, but the container susceptible to interference. Therefore, it is possible to suppress the containers 31 from interfering with each other due to the container 31 of "#1" in the destination node 23, and it is possible to suppress the deterioration in performance of each container 31 in the destination node 23.

Further, it is considered that the plurality of nodes 23 includes a node in which the containers 31 easily interfere with each other and a node in which the containers 31 hardly interfere with each other.

Figure 8:
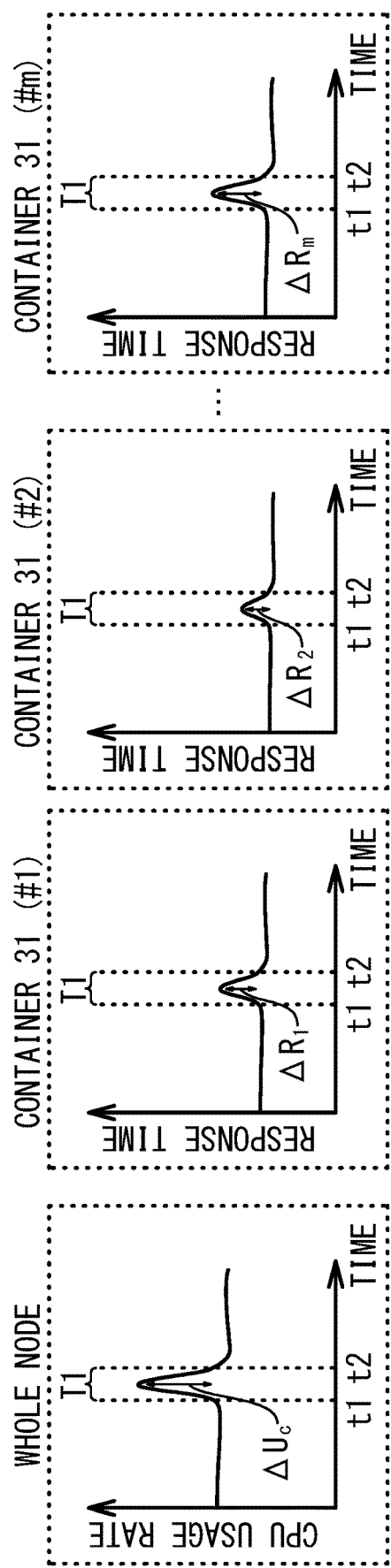
FIG. 8 is a schematic diagram illustrating the definition of an interference index in the first embodiment.

Therefore, in the present embodiment, an interference index indicating whether the container 31 is susceptible to the interference is defined for each node 23 as follows. FIG. 8 is a schematic diagram illustrating the definition of the interference index in the present embodiment.

As illustrated in FIG. 8, it is assumed that an increase amount of the usage rate of the CPU 23c in the whole of a certain node 23 is $\Delta U_c$ in the time zone T1. Further, it is assumed that increase amounts of the response time of the containers 31 of "#1", "#2", . . . "#m" in the node 23 are $\Delta R_1$, $\Delta R_2$, . . . $\Delta R_m$ in the same time zone T1, respectively.

In this case, an interference index $X_c$ of the node 23 with respect to the CPU 23c is defined by the following equation (1).

$$X_c = \frac{\Delta R_1}{\Delta U_c} + \frac{\Delta R_2}{\Delta U_c} + \ldots + \frac{\Delta R_m}{\Delta U_c} \quad (1)$$

As illustrated in the equation (1), the interference index $X_c$ is defined as a value obtained by adding ratios of the increase amounts $\Delta R_1, \Delta R_2, \ldots \Delta R_m$ of the response time and the increase amount $\Delta U_c$ of the the usage rate, with respect to all the containers 31. According to this definition, the interference index $X_c$ represents a degree to which the response time of each container 31 increases when the usage rate of the CPU 23c in the whole of the node 23 increases.

A functional form of the interference index L is not limited to the equation (1). Any function which includes the respective increase amounts $\Delta R_1, \Delta R_2, \ldots \Delta R_m$, and $\Delta U_c$, and represents a degree to which the response time of each container 31 increases when the usage rate of the CPU 23c in the whole of the node 23 increases can be employed as the interference index $X_c$.

When the interference index $X_c$ is small, the response time of each container 31 does not increase even if the usage rate of the CPU 23c increases. In this case, it can be determined that the node 23 is a node in which the containers 31 hardly interfere with each other via the CPU 23c.

Similar to the above, the respective interference indexes $X_m, X_s$, and $X_n$ for the memory 23b, the storage 23a, and the NIC 23d are defined as follows.

$$X_m = \frac{\Delta R_1}{\Delta U_m} + \frac{\Delta R_2}{\Delta U_m} + \ldots + \frac{\Delta R_m}{\Delta U_m} \quad (2)$$

$$X_s = \frac{\Delta R_1}{\Delta U_s} + \frac{\Delta R_2}{\Delta U_s} + \ldots + \frac{\Delta R_m}{\Delta U_s} \quad (3)$$

$$X_n = \frac{\Delta R_1}{\Delta U_n} + \frac{\Delta R_2}{\Delta U_n} + \ldots + \frac{\Delta R_m}{\Delta U_n} \quad (4)$$

Hereinafter, each set of interference indexes ($X_c, X_m, X_s, X_n$) is referred to as interference index information G. The interference index information C is information defined for each node 23, and the destination node 23 of the container 31 is determined based on the interference index information G.

In this embodiment, each node 23 notifies all other nodes 23 of the interference index information G, so that each node 23 shares the interference index information G of all nodes.

Figure 9:
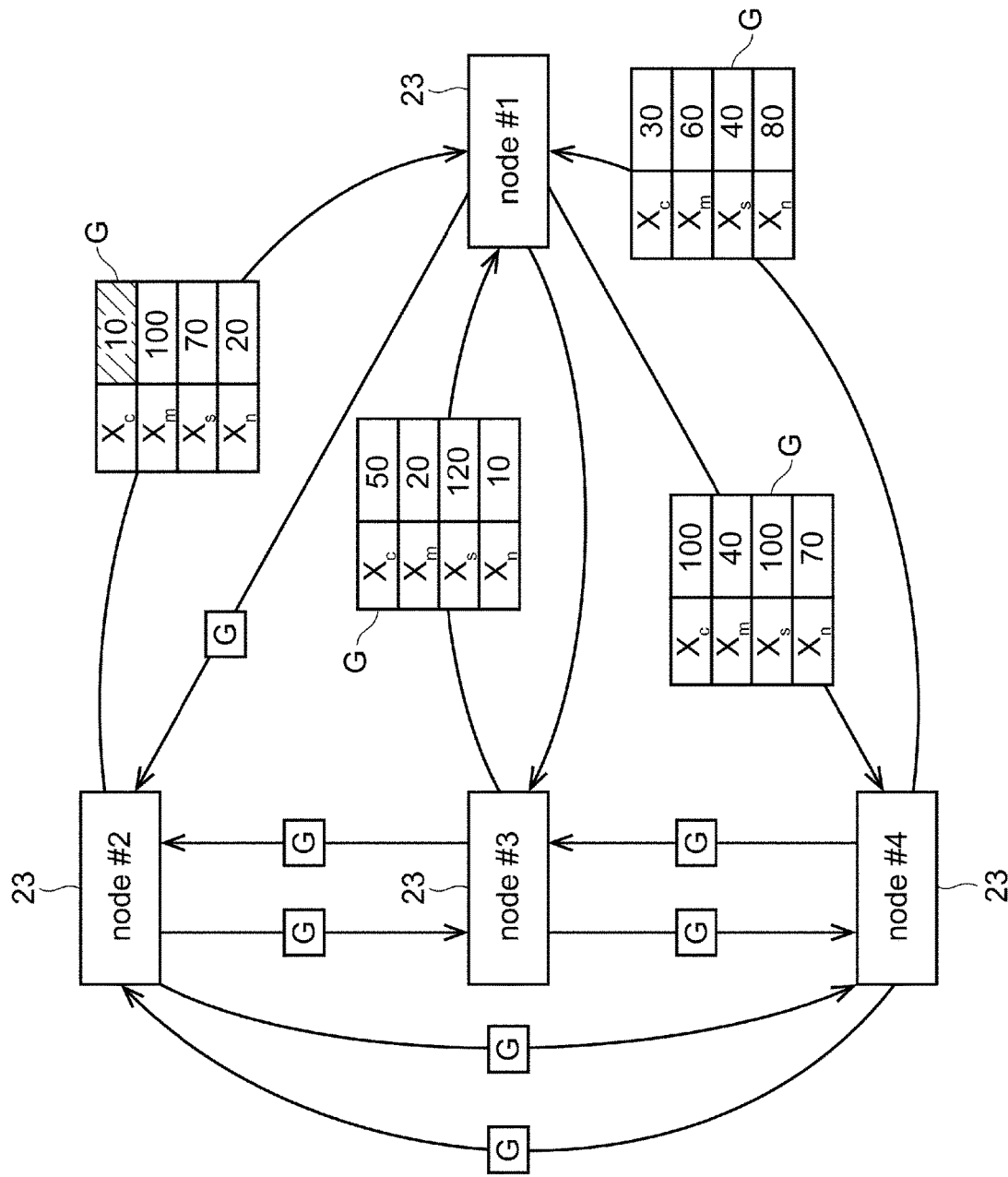
FIG. 9 is a schematic diagram illustrating; the transfer of the interference index between nodes in the first embodiment.

FIG. 9 is a schematic diagram illustrating the transfer of the interference index information G between the nodes 23 in the present embodiment.

FIG. 9 illustrates a case where the nodes 23 of "node #1", "node #2", "node 43", and "node #4" mutually notify the interference index information G.

Thereby, each node 23 can store the interference index information G of all nodes in a storage unit such as a memory or storage, and can determine the destination node 23 of the container 31 based on the interference index information C of all nodes.

For example, it is considered where to set the destination node 23 of the container 31 of "#1" when the container 31 of "#1" in the node 23 of "node #1" is vulnerable to the interference via the CPU 23c.

As illustrated in FIG. 9, a node which has the smallest interference index Xc with respect to the CPU 23c among all nodes 23 and in which the performance of the container 31 is hardly to deteriorate due to the interference via the CPU 23c is the node 23 of "node #2". Therefore, even if the container 31 of "#1" in "node #1" is migrated to "node #2", it is possible to suppress the container 31 from being interfered in "node #2" again and its performance from being deteriorated. Therefore, in this case, the node 23 of "node #1" determines the destination node of the container 31 of "#1" booted on its own node, as "node #2".

Figure 10:
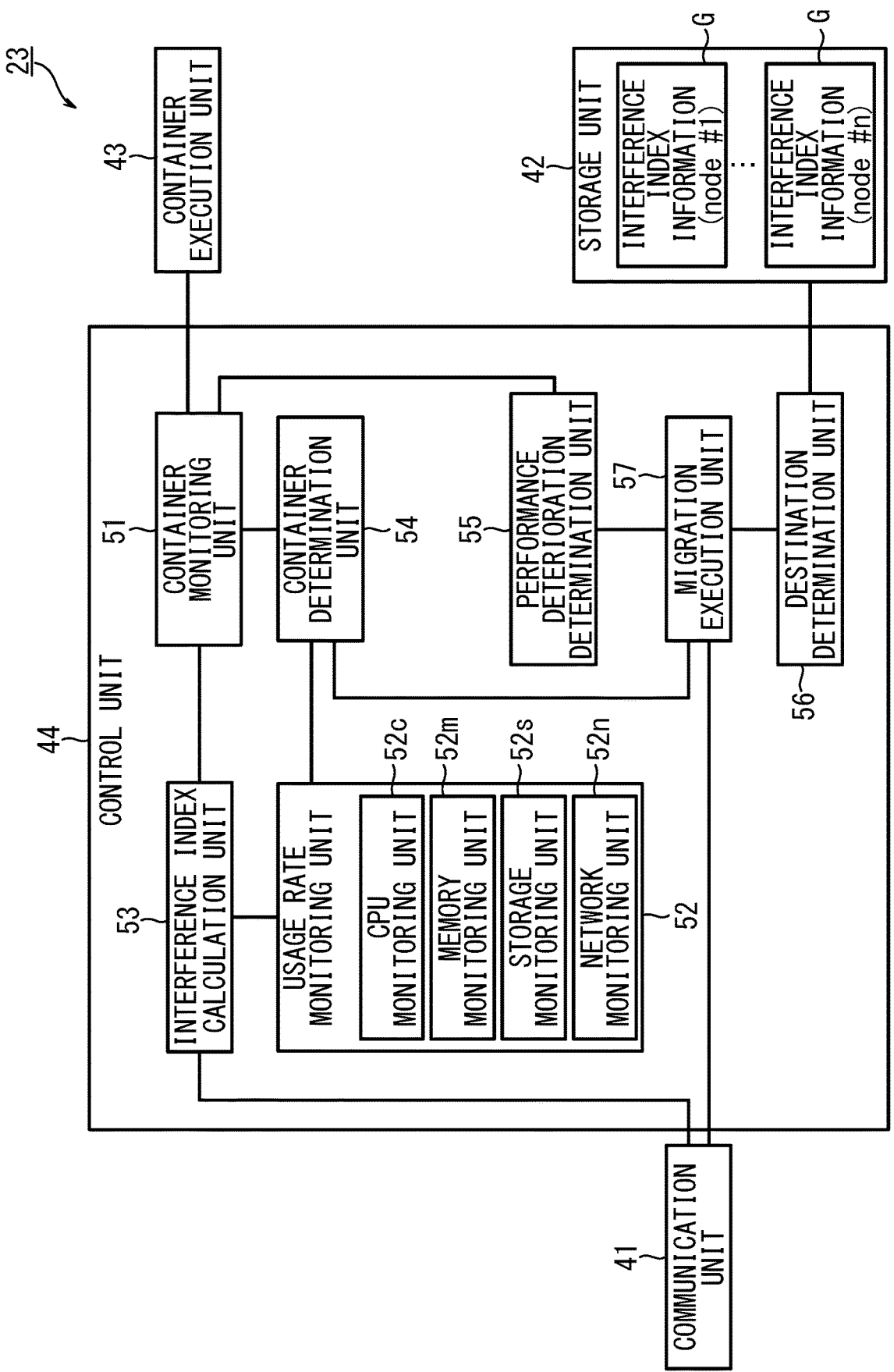
FIG. 10 is a diagram illustrating the functional configuration of the node according to the first embodiment.

Next, a description is given of the functional configuration of the node 23 according to the present embodiment. FIG. 10 is a diagram illustrating the functional configuration of the node 23 according to the present embodiment. As illustrated in FIG. 10, the node 23 includes a communication unit 41, a storage unit 42, a container execution unit 43, and a control unit 44.

Among these, the communication unit 41 is a processing unit realized by the NIC 23d (see FIG. 5). Here, the communication unit 41 functions as an interface for connecting its own node to the other node 23 or the user terminal 22 via the network 24.

The storage unit 42 is realized by the storage 23a (see FIG. 5) and the memory 23b, and stores the interference index information Ci of all nodes 23 of "node #1" to "node #n" connected to the network 24.

The container execution unit 43 is a processing unit realized by executing the container engine 27 by the cooperation of the CPU 23c and the memory 23b. The plurality of containers 31 are booted in the single node 23 by the container execution unit 43.

The control unit 44 is a processing unit realized by executing the determination program 28 by the cooperation of the CPU 23c and the memory 23b. The control unit 44 includes a container monitoring unit 51, a usage rate monitoring unit 52, an interference index calculation unit 53, a container determination unit 54, a performance deterioration determination unit 55, a destination determination unit 56, and a migration execution unit 57.

The container monitoring unit 51 is a processing unit that monitors the response time, data processing amount, and the usage rate of the resource for each of the plurality of containers 31. The usage rate of the resource includes the usage rate of each of the storage 23a, the memory 23b, the CPU 23c, and the NIC 23d.

The usage rate monitoring unit 52 is a processing unit that monitors the usage rate of each resource in the whole of the node 23. The resources monitored by the usage rate monitoring unit 52 include the CPU 23c, the memory 23b, the storage 23a, and the NIC 23d. Here, the usage rate monitoring unit 52 includes a CPU monitoring unit 52c, a memory monitoring unit 52m, a storage monitoring unit 52s, and a network monitoring unit 52n.

The CPU monitoring unit 52c monitors a usage rate of the CPU 23c, and the memory monitoring unit 52m monitors a usage rate of the memory 23b. The storage monitoring unit 52s monitors a usage rate of the storage 23a. Then, the network monitoring unit 52n monitors a usage rate of the bandwidth of the network connected to the NIC 23d.

The interference index calculation unit 53 is a processing unit that calculates the interference index information G of its own node 23 according to the method illustrated in FIG. 8 and stores it in the storage unit 42. As described above, the interference index information G includes the interference indexes $X_c, X_m, X_s$, and $X_n$ for each resource. The interference index calculation unit 53 notifies the interference index information G of its own node 23 to the other node 23 via the communication unit 41.

The communication unit 41 receives the interference index information G of the other node 23 and stores it in the storage unit 42.

The container determination unit 54 is a processing unit that determines a container 31 to be migrated to the other node 23. For example, the container determination unit 54 identifies the container 31 vulnerable to the interference via the certain resource according to the method illustrated in FIG. 7, and determines that the identified container 31 is the container to be migrated to the other node 23.

The performance deterioration determination unit 55 is a processing unit that determines whether the performance of the container 31 determined by the container determination unit 54 deteriorates to a degree that the container 31 must actually migrate to the other node 23.

Figure 11:
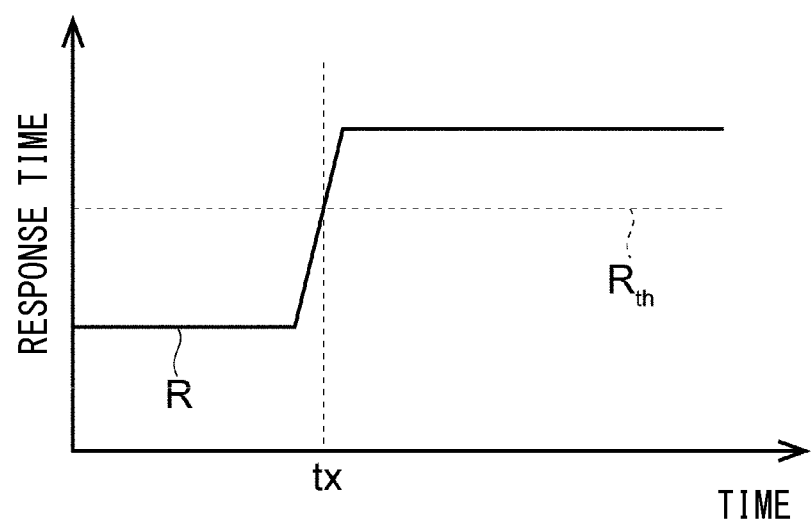
FIG. 11 is a schematic diagram illustrating the processing of a performance deterioration determination unit according to the first embodiment.

FIG. 11 is a schematic diagram illustrating the processing of the performance deterioration determination unit 55 according to the first embodiment.

The performance deterioration determination unit 55 determines whether the response time R of the container 31 monitored by the container monitoring unit 51 exceeds a threshold value $R_{th}$. The threshold value $R_{th}$ is a reference value for determining whether the performance of the container 31 deteriorates to the extent that the container 31 must be migrated to the other node 23.

Then, the performance deterioration determination unit 55 determines that the performance of the container 31 deteriorates at a time ix when the response time R exceeds the threshold value $R_{th}$.

The destination determination unit 56 is a processing unit that determines the destination node 23 of the container 31 with reference to the interference index information G of all the nodes 23 stored in the storage unit 42. For example, it is assumed that the container 31 vulnerable to the interference via the CPU 23c is determined by the container determination unit 54. In this case, the destination determination unit 56 determines the node 23 having the smallest interference index $X_c$ with respect to the CPU 23c among the plurality of nodes 23 as the destination of the container 31.

The migration execution unit 57 is a processing unit that actually migrates the container 31 to the other node 23. The container 31 to be migrated is the container 31 determined by the container determination unit 54 to be vulnerable to the interference. The timing of migration is the timing when the performance deterioration determination unit 55 determines that the performance deteriorates. The destination node 23 is the node 23 determined by the destination determination unit 56.

Figure 12:
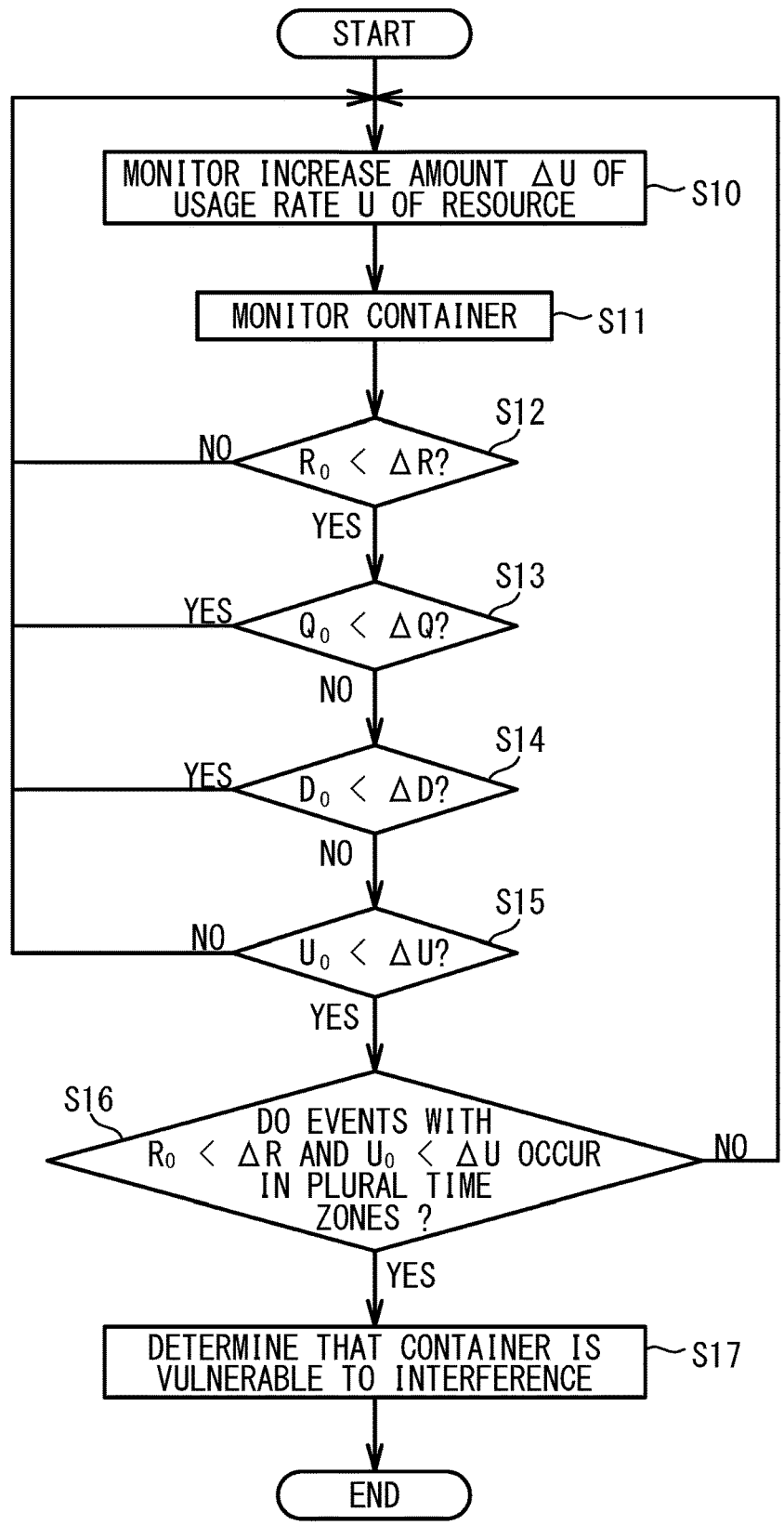
FIG. 12 is a flowchart illustrating a method for determining a container to be migrated according to the first embodiment.

Next, a description is given of a method for determining the container to be migrated according to the present embodiment. FIG. 12 is a flowchart illustrating the method for determining the container to be migrated according to the present embodiment. Hereinafter, the description is made with reference to FIG. 7 described above as appropriate.

This flowchart is executed for each of the plurality of containers 31 in the single node 23 while actually providing the service to the user terminal 22 in the system 21. First, the description is given of a case where this flowchart is executed for the container 31 of "#1" in FIG. 7.

First, the usage rate monitoring unit 52 monitors the increase amount ΔU of the usage rate U of the resource in the whole of its own node 23 (step S10). The increase amount ΔU includes respective increase amounts $\Delta U_c$, $\Delta U_m$, $\Delta U_s$ and $\Delta U_n$ of the usage rates of the CPU 23c, the memory 23b, the storage 23a and the NIC 234.

Next, the container monitoring unit 51 monitors each of the response time of the container 31 of "#1", the usage rate of the resource used by the container 31, and the data processing amount of the container 31 (step S11). At this time, the container monitoring unit 51 also monitors an increase amount ΔR of the response time of the container 31, an increase amount ΔQ of the usage amount of the resource, and an increase amount ΔD of the data processing amount.

Next, the container determination unit 54 determines whether the response time in the time zone T1 (see FIG. 7) increases (step S12). The start time and the length in the time zone T1 and are not particularly limited, and can be set randomly.

Here, the above-mentioned predetermined value $R_o$ is adopted as a criterion for determining whether the response time increases. In this case, the container determination unit 54 determines that the response time increases when the increase amount ΔR of the response time in the time zone T1 exceeds the predetermined value $R_o$, and determines that the response time does not increase otherwise.

When the increase amount ΔR does not exceed the predetermined value $R_0$ (step S12: NO), the process returns to step S10.

When the increase amount ΔR exceeds the predetermined value $R_0$ (step S12; YES, the process proceeds to step S13. In the container 31 of "#1" in FIG. 7, it is determined that the increase amount ΔR exceeds the predetermined value $R_o$, and hence the process proceeds to step S13.

In step S13, the container determination unit 54 determines whether the increase amount ΔQ of the usage rate Q of any resource among the plurality of resources used by the container 31 of "#1" in the time zone T1 exceeds the predetermined value $Q_0$. The increase amount ΔQ includes respective increase amounts $\Delta B_c$, $\Delta B_m$, $\Delta B_s$, and $\Delta B_n$ of the usage rates of the CPU 23c, the memory 23b, the storage 23a, and the MC 23d. Further, predetermined values with respect to these usage rates include the above-mentioned $B_{c0}$, $B_{m0}$, $B_{s0}$, and $B_{n0}$.

When the usage rate of any resource among the plurality of resources exceeds the predetermined value (step S13: YES), the process returns to step S10.

When the usage rate of any resource among the plurality of resources does not exceed the predetermined value (step S13: YES), the process proceeds to step S14. In the container 31 of "#1" in FIG. 7, the increase amounts ΔBc, ΔBm, ΔBs, and ΔBn do not exceed the predetermined values Bc0, Bm0, Bs0, and Bn0, respectively, and hence the process proceeds to step S14.

In step S14, the container determination unit 54 determines whether the increase amount ΔD of the data processing amount of the container 31 in the time zone T1 exceeds the predetermined value M.

When the increase amount ΔD exceeds the predetermined value $D_0$ (step S14: YES), the process returns to step S10.

When the increase amount ΔD does not exceed the predetermined value $D_0$ (step S14: NO), the process proceeds to step S15. In the container 31 of "#1" in FIG. 7, the increase amount ΔD does not exceed the predetermined value $D_0$, and hence the process proceeds to step S15.

In step S15, the container determination unit 54 determines whether the increase amount ΔU of the usage rate of any resource among the plurality of resources in the node 23 exceeds the predetermined value $U_0$. The increase amount ΔU includes respective increase amounts $\Delta U_c$, $\Delta U_m$, $\Delta U_s$, and $\Delta U_n$ of the usage rates of the CPU 23c, the memory 23b, the storage 23a, and the NIC 23d, as described above. Further, the predetermined value $U_0$ includes $U_{c0}$, $U_{m0}$, $U_{s0}$, and $U_{n0}$.

When the increase amount $\Delta U$ of the usage rate of any resource among the plurality of resources does not exceed the predetermined value U0 (step S15: NO), the process returns to step S10.

When the increase amount $\Delta U$ of the usage rate of any resource among the plurality of resources exceeds the predetermined value $U_0$ (step S15:YES), the process proceeds to step S16. In the example of FIG. 7, the increase amount $\Delta U_c$ of the usage rate of the CPU 23c in the whole of the node 23 exceeds the predetermined value Uc0 in the time zone T1, and hence the process proceeds to step S16.

In step S16, the container determination unit 54 determines whether an event in which $R_0 < \Delta R$ is determined in step S12 and $U_0 < \Delta U$ is determined in step S15 occurs in each of a plurality of time zones.

When such an event does not occur (step S16:NO), the process returns to step S10.

When the event occurs (step S16: YES), the process proceeds to step S17. In the example of FIG. 7, the event occurs in each of the time zone T1 and the time zone T2, and hence the process proceeds to step S17.

In step S17, the container determination unit 54 determines that the container 31 is the container vulnerable to the interference and the container to be migrated to the other node 23. The container 31 thus determined is an example of the first container. Further, the container determination unit 54 determines that the resource mediating the interference of the container 31 is the resource in which the increase amount $\Delta U$ of the usage rate is determined in step S15 to exceed the predetermined value $U_0$.

In this way, basic steps in the method for determining the container to be migrated according to the present embodiment are completed.

After that, each of the above processes is performed on each of remaining containers 31 booted in the single node 23 to determine whether all containers 31 in the node 23 are vulnerable to the interference.

According to this method, when the usage rate U of the resource in the whole of the node 23 increases in the time zone T1 (step S15: YES), it is determined whether the containers 31 booted in the node 23 are vulnerable to the interference. Further, when the response time of the container 31 increases in the time zone T1 (step S12: YES) and the parameters $\Delta Q$ and $\Delta D$ do not exceed the predetermined values (steps S13 and S14: NO), the container 31 is determined to be vulnerable to the interference. According to this, it can be easily determined whether the container 31 is vulnerable to the interference by monitoring the usage rate U of the resource in the whole of the node 23, the response time of the container 31, and the parameters $\Delta Q$ and $\Delta D$.

Here, step S13 and step S14 are performed in series to determine whether the container 31 is vulnerable to the interference when both of the two parameters $\Delta Q$ and $\Delta D$ do not exceed the predetermined values, but the present embodiment is not limited to this. For example, when only one of the two parameters $\Delta Q$ and $\Delta D$ exceeds the predetermined value, it may be determined whether the container 31 is vulnerable to the interference.

Moreover, in step S16, it is determined whether there are a plurality of time zones in which the response time of the container 31 increases, and the usage rate U increases in each time zone. Thereby, it is possible to eliminate the case where the usage rate U and the response time of the container 31 accidentally increase at the same time in a single time zone even though the container 31 is resistant to the interference, which makes it possible to accurately determine whether the container 31 is vulnerable to the interference. When the accuracy of the determination is not an issue, step S16 may be omitted.

Further, since the results of monitoring each value of $\Delta R$, $\Delta Q$, $\Delta D$, and $\Delta U$ in real time are used in steps S12 to S15, the container determination unit 54 can determine in real time whether the container 31 is vulnerable to the interference based on these monitoring results.

A description is given of a method for sharing the interference index information G between the plurality of nodes 23.

Figure 13:
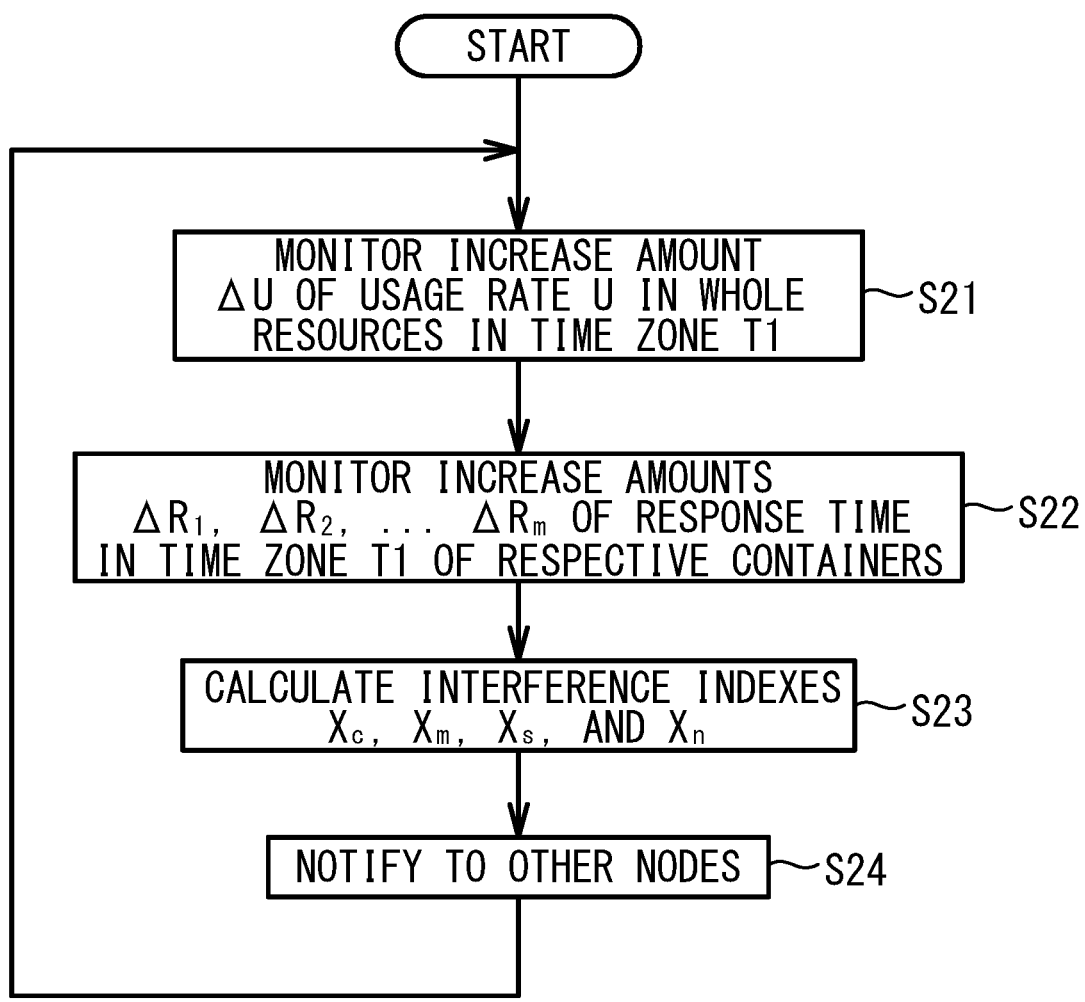
FIG. 13 is a flowchart illustrating a method for sharing interference index information between a plurality of nodes in the first embodiment.

FIG. 13 is a flowchart illustrating the method for sharing interference index information G between the plurality of nodes 23 in the first embodiment.

First, the usage rate monitoring unit 52 in each node 23 monitors the increase amount $\Delta U$ of the usage rate of each of the plurality of resources in its own node in a certain time zone T1 (step S21).

For example, the CPU monitoring unit 52c in the usage rate monitoring unit 52 monitors an increase amount $\Delta U_c$ of the usage rate of the CPU 23c, and the memory monitoring unit 52m monitors an increase amount $\Delta U_m$ of the usage rate of the memory 23b. Then, the storage monitoring unit 52s monitors an increase amount $\Delta U_s$ of the usage rate of the storage 23a, and the network monitoring unit 52n monitors an increase amount $\Delta U_n$ of the usage rate of the NIC 23d.

Next, the container monitoring unit 51 monitors the increase amounts $\Delta R_1$, $\Delta R_2$, . . . $\Delta R_m$ of the response time in the time zone T1 of respective containers 31 of "#1", "#2", . . . "#m" (step S22).

Next, the interference index calculation unit 53 calculates the interference indexes $X_c$, $X_m$, $X_s$, and $X_n$ using the above-mentioned increase amounts $\Delta U_c$, $\Delta U_m$, $\Delta U_s$, and $\Delta U_n$ of the usage rate and the increase amounts $\Delta R_1$, $\Delta R_2$, . . . $\Delta R_m$ of the response time (Step S23). These interference indexes $X_c$, $X_m$, $X_s$, and $X_n$ are calculated by the interference index calculation unit 53 according to the above equations (1) to (4). The interference index calculation unit 53 stores the interference indexes $X_c$, $X_m$, $X_s$, and $X_n$ as the interference index information G in the storage unit 42.

Next, the communication unit 41 notifies all of the other nodes 23 of the interference index information G of its own node (step S24). After that, the process returns to step S21 again, and steps S21 to S24 are periodically repeated. Each time steps S21 to S24 are repeated, the interference index calculation unit 53 may calculate a moving average of the interference index information G of all nodes and store the moving average in the storage unit 42 as new interference index information G.

In this way, the interference index information G can be shared in all nodes 23.

Next, a description is given of a method for determining the destination node 23 of the container 31.

Figure 14:
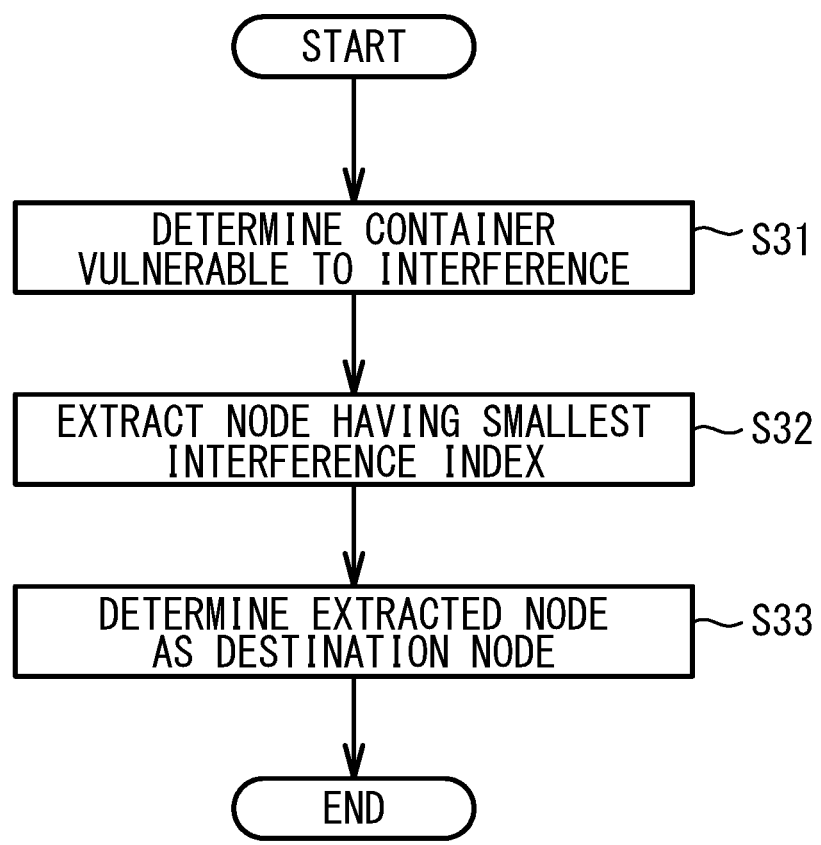
FIG. 14 is a flowchart illustrating a method for determining a destination node of the container in the first embodiment.

FIG. 14 is a flowchart illustrating the method for determining the destination node 23 of the container 31 in the first embodiment.

First, by executing the flowchart of FIG. 12, the container determination unit 54 determines a container vulnerable to the interference via the certain resource among the plurality of containers 31 booted in its own node (step S31). Hereinafter, a description is given of a case where the container determination unit 54 determines the container 31 vulnerable to the interference via the CPU 23c, as an example.

Next, the destination determination unit 56 extracts the node 23 having the smallest interference index with reference to the interference index information G of all nodes 23 (second nodes) stored in the storage unit 42 (step S32).

For example, when it is focused on the interference via the CPU 23c as described above, the destination determination unit 56 extracts the node 2; having the smallest interference index $X_c$ with respect to the CPU 23c among all nodes 23.

Then, the destination determination unit 56 determines the extracted node 23 as the destination node (step S33).

In this way, it is possible to determine the destination node 23 of the container 31 vulnerable to the interference via the resource.

According to this method of determining the destination node 23, in steps S32 and S33, the destination determination unit 56 determines the node 23 having the smallest interference index as the destination.

The interference index is an index in which the smaller the value, the more difficult it is for the containers 31 to interfere with each other, as described with reference to the equations (1) to (4). Therefore, by setting the node 23 having the smallest interference index as the destination in this way, a possibility of the interference of the container 31 migrated to the destination can be reduced, and the performance such as the response time of the container 31 can be maintained.

Figure 15:
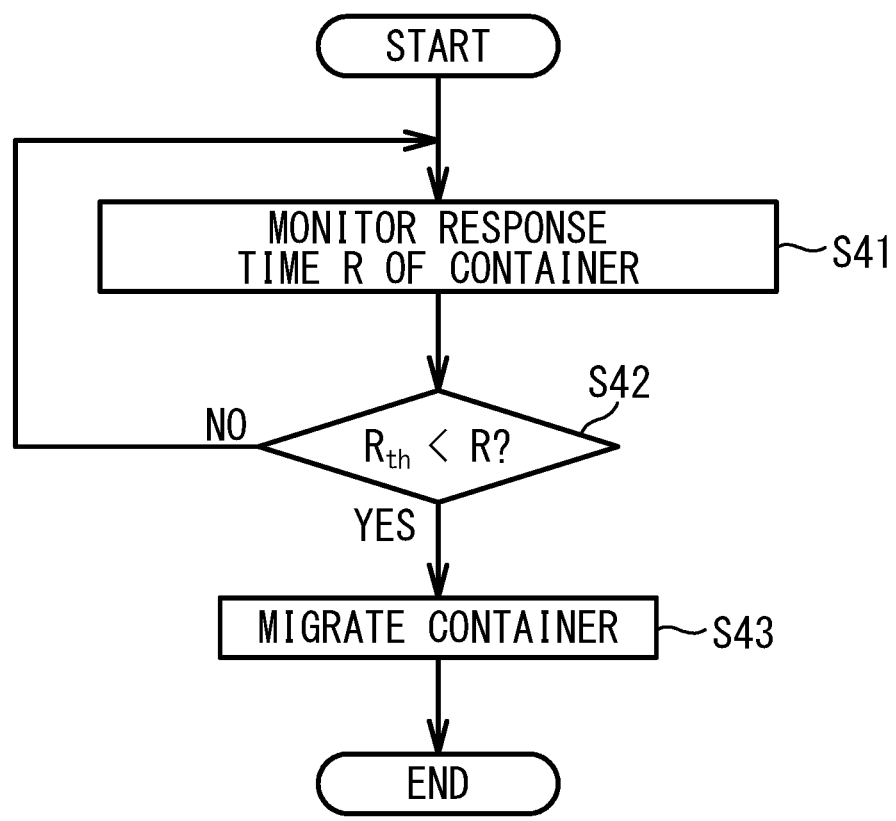
FIG. 15 is a flowchart illustrating a method for migrating the container in the first embodiment.

Next, a description is given of a method for migrating the container 31. FIG. 15 is a flowchart illustrating the method for migrating the container 31 in the first embodiment.

First, the container monitoring unit 51 in each node 23 monitors the response time R of the container 31 at predetermined time intervals, and notifies the performance deterioration determination unit 55 of a monitoring result (step S41). Here, the container 31 to be monitored is the container 31 determined by the container determination unit 54 to be vulnerable to the interference in step S17 (see FIG. 12).

Next, the performance deterioration determination unit 55 determines whether the response time R exceeds the threshold value $R_{th}$ (step S42). When the response time R does not exceed the threshold value $R_{th}$ (step S42: NO), the process returns to step S41, and the container monitoring unit 51 continues to monitor the response time R.

When the response time R exceeds the threshold value $R_{th}$ (step S42: YES), the process proceeds to step S43.

In step S43, the migration execution unit 57 migrates the container 31 to the node 23 determined by the destination determination unit 56. This completes the method of migrating the container 31.

According to this migrating method, in step S42, the container 31 whose performance is determined to be actually deteriorated by the performance deterioration determination unit 55 is migrated to the other node 23. Thereby, the performance of the container 31 can be recovered in the destination, so that the technical performance such as the response time in the whole of the system 21 can be improved as compared with before the migration.

Moreover, the container 31 to be migrated is not the container 31 that is a source of the interference, but the container 31 that the container determination unit 54 determines to be vulnerable to the interference. The container 31 vulnerable to the interference is unlikely to become an interference source in the destination and reduce the performances of other containers 31. Therefore, in the present embodiment, it is possible to suppress the deterioration in performance such as the response time in the whole of the system 21 in association with the migration of the container 31, and it is possible to improve the performance in the whole of the system 21.

Second Embodiment

In the first embodiment, all nodes 23 share the interference index information G, but in the present embodiment, one of the plurality of nodes 23 is defined as a representative node, and the representative node manages the interference index information G.

Figure 16:
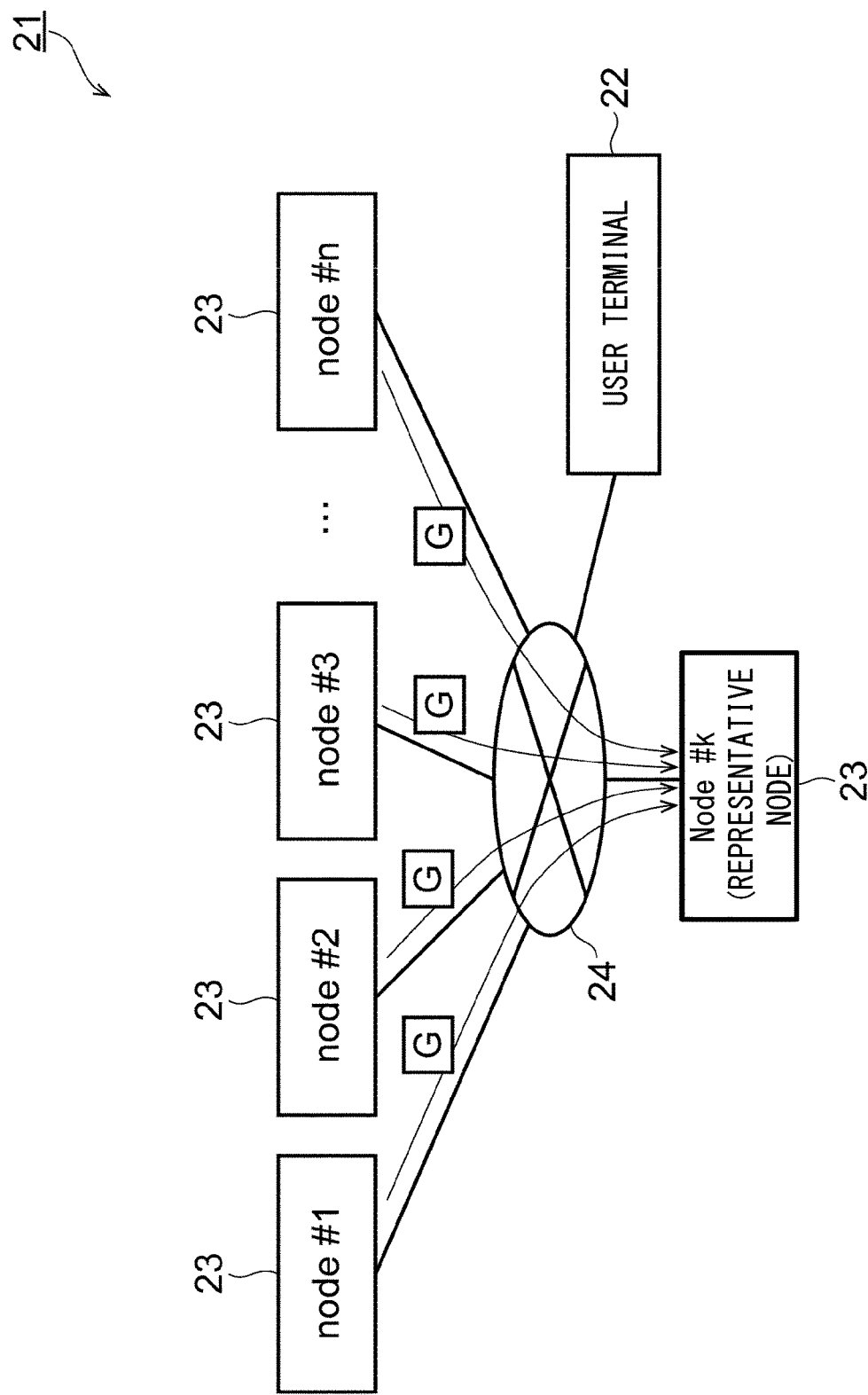
FIG. 16 is a diagram illustrating the system configuration of a system according to a second embodiment.

FIG. 16 is a diagram illustrating the system configuration of the system 21 according to the present embodiment. In FIG. 16, elements corresponding to those in the first embodiment are designated by identical reference numerals, and the description thereof is omitted.

Here, a description is given of a case where the node 23 of "node #k" is the representative node, as an example. Note that the representative node is an example of the third node, and any one of the nodes 23 other than the representative node is an example of the fourth node. In this case, in the present embodiment, the communication unit 41 (see FIG. 10) in each of the plurality of nodes 23 transmits the interference index information G of its own node to the representative node 23. Then, the representative node 23 acquires the interference index information G via the communication unit 41 of its own node, and stores it in the storage unit 42 (see FIG. 10) of the its own node.

In this case, the destination determination unit 56 in the node 23 other than the representative node inquires the representative node about the destination node 23 as follows.

Figure 17:
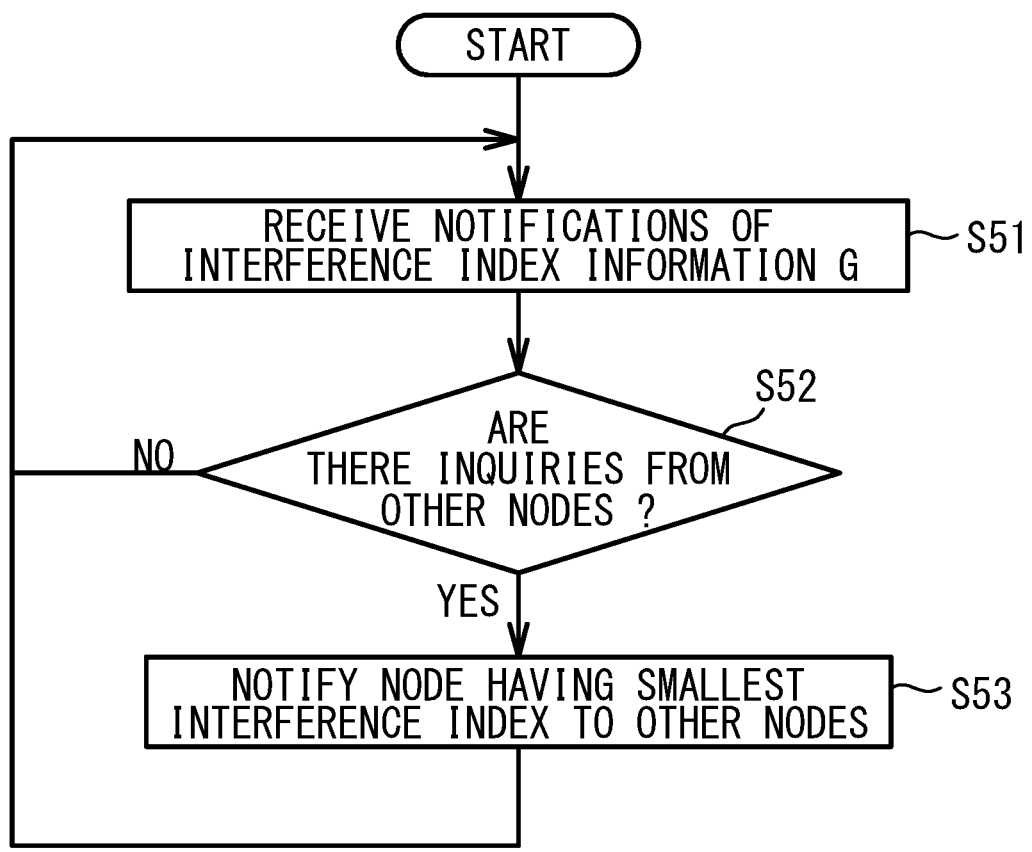
FIG. 17 is a flowchart illustrating the operation of a representative node in the second embodiment.

FIG. 17 is a flowchart illustrating the operation of the representative node in the present embodiment.

First, the communication unit 41 in the representative node 23 receives notifications of the interference index information G from all other nodes 23, and stores the interference index information G in the storage unit 42 of its own node (step S51).

Next, the destination determination unit 56 in the representative node 23 determines whether to receive inquiries from the other nodes 23 about which node 23 has the smallest interference index with respect to a certain resource (step S52).

When the destination determination unit 56 do not receive the inquiries (step S52: NO), the process returns to step S51.

When the destination determination unit 56 receives the inquiries (step S52: YES), the process proceeds to step S53.

In step S53, the destination determination unit 56 in the representative node 23 notifies the node 23 having the smallest interference index to the other nodes 23 of an inquiry source via the communication unit 41. For example, in the case of an inquiry for the interference index $X_c$ with respect to the CPU 23c, the destination determination unit 56 notifies the node 23 having the smallest interference index $X_c$ to the other nodes 23 of the inquiry source. This completes the basic steps of the operation of the representative node 23.

According to the present embodiment described above, the representative node stores all interference index information G of all nodes 23, and hence the representative node can centrally manage the interference index information G. Moreover, since the nodes 23 other than the representative node do not need to store the interference index information G of the nodes other than its own node in the storage unit 42, the capacity of the storage unit 42 can be saved.

Third Embodiment

In the first embodiment, when the system 21 actually provides the service to the user terminal 22 for example, the node 23 monitors the data processing amount or the like in the container 31 in real time, as illustrated in FIG. 7. Then, the node 23 determines the container 31 vulnerable to the interference based on the monitoring result.

In contrast, in the present embodiment, the container 31 vulnerable to the interference is determined in advance in a test environment prior to providing the service in the system 21.

Figure 18:
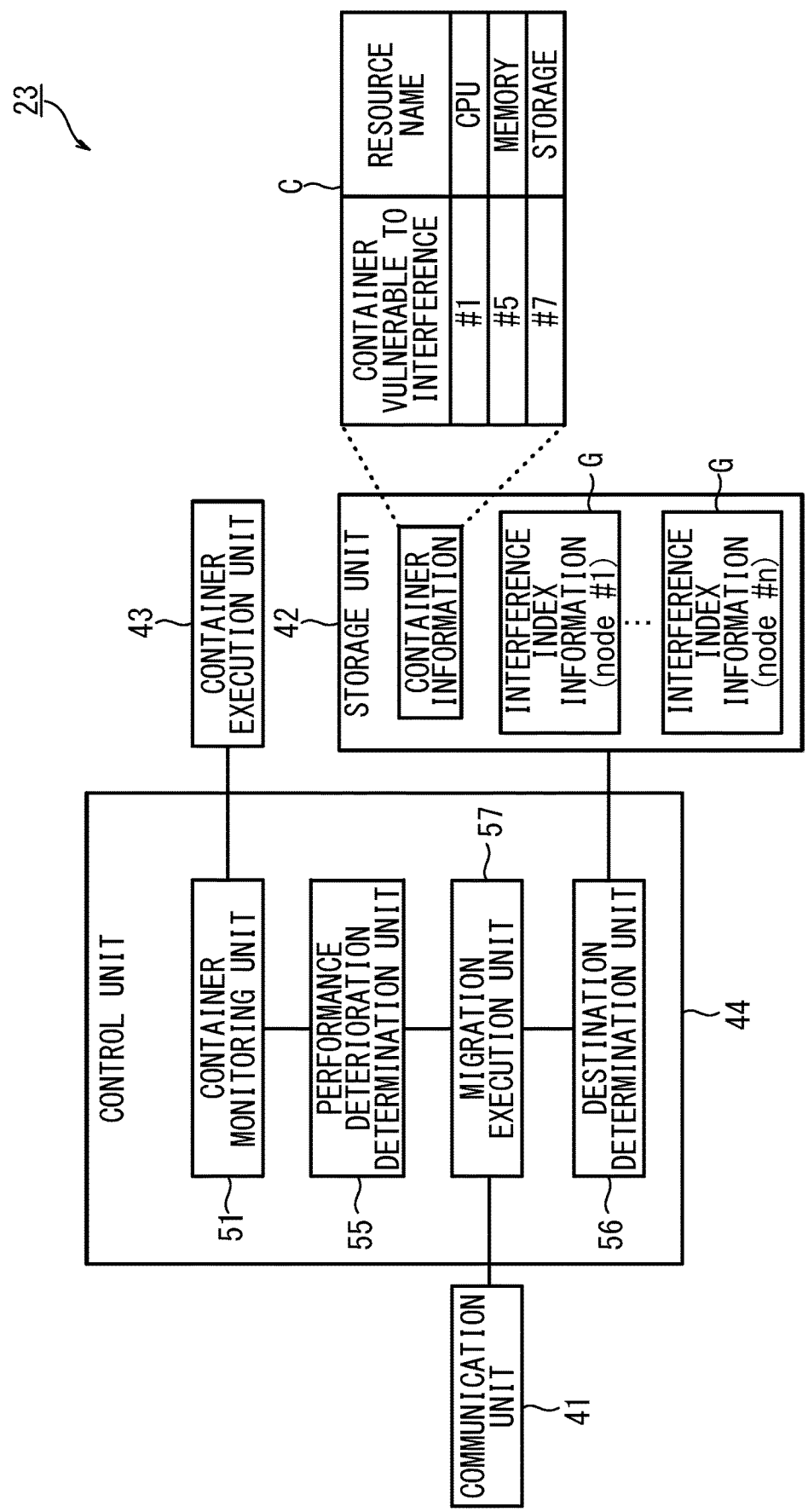
FIG. 18 is a diagram illustrating the functional configuration of the node according to a third embodiment.

FIG. 18 is a diagram illustrating the functional configuration of the node 23 according to the present embodiment. In FIG. 18, elements corresponding to those in the first embodiment are designated by identical reference numerals, and the description thereof is omitted.

In the present embodiment, container information C is stored in advance in the storage unit 42 before the service is actually provided by using the node 23, as illustrated in FIG. 18.

The container information C is information that identifies the container 31 to be migrated to the other node 23. Here, the administrator of the system 21 associates the container 31 vulnerable to the interference via the certain resource with its resource, and stores them in the container information C. For example, when the container 31 of "#1" is vulnerable to the interference via the CPU 23c, the administrator associates the character string "#1" identifying the container 31 with a resource name "CPU", and stores them in the container information C.

As described above, the container 31 vulnerable to the interference may be determined in advance according to the first embodiment in the same test environment as the system 21 for example, and may be stored in the container information C by the administrator. After the storage unit 42 stores the container information C, the system 21 may be switched from the test environment to an active environment. Thus, a method of switching the test environment to the active environment is also called blue-green deployment.

The container monitoring unit 51 monitors the response time R of the container 31 included in the container information C among the plurality of containers 31 booted in its own node. The performance deterioration determination unit 55 determines whether the response time R exceeds the threshold value $R_{th}$. Also, the migration execution unit 57 migrates the container 31 to the other node 23 when it is determined that the response time R exceeds the threshold value $R_{th}$.

The destination node 23 of the container 31 is determined by the destination determination unit 56. For example, when the container 31 is associated with the CPU in the container information C, the destination determination unit 56 determines the node 23 having the smallest interference index $X_c$ with respect to the CPU, as the destination node.

Figure 19:
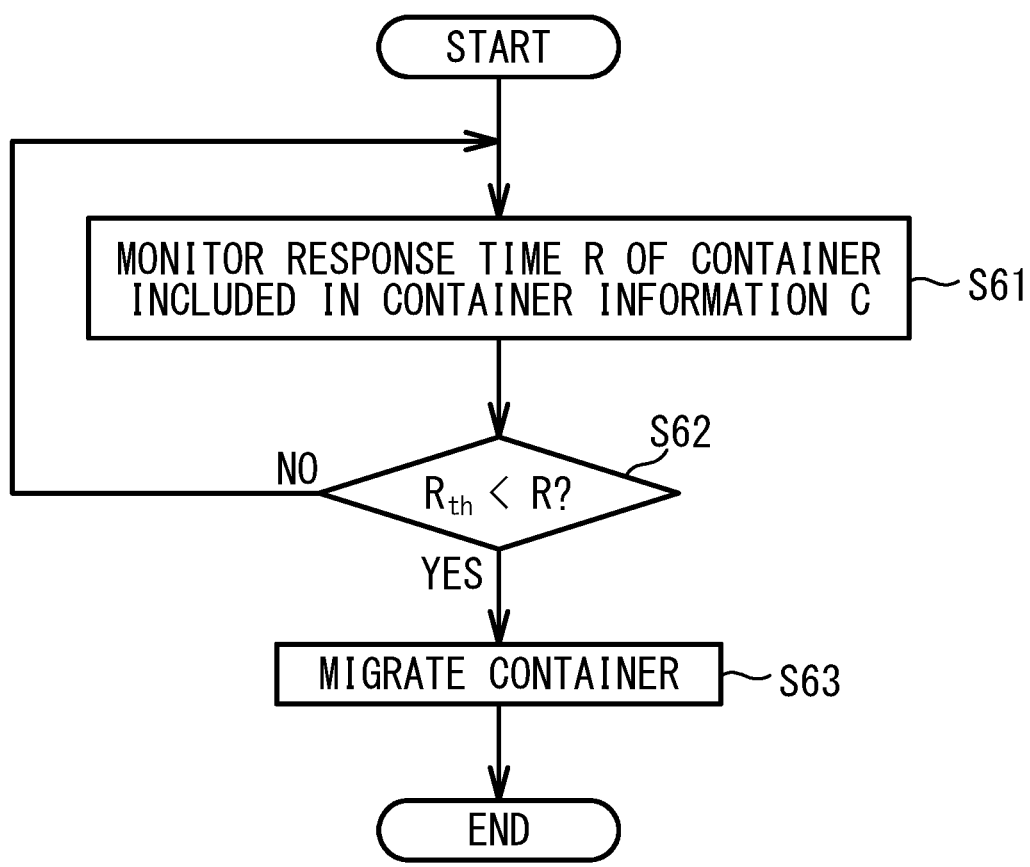
FIG. 19 is a flowchart illustrating a method for migrating the container in the third embodiment.

FIG. 19 is a flowchart illustrating a method for migrating the container in the present embodiment. First, the container monitoring unit 51 monitors the response time R of each container 31 included in the container information C (step S61).

Next, the performance deterioration determination unit 55 determines whether the response time R of each container 31 exceeds the threshold value $R_{th}$ (step S62).

When the response time R does not exceed the threshold value $R_{th}$ (step S62:NO), the process returns to step S61.

When the response time R exceeds the threshold value $R_{th}$ (step S62: YES), the process proceeds to step S63.

In step S63, the migration execution unit 57 migrates the container 31 in which the response time R exceeds the threshold value $R_{th}$, to the other node 23. The destination node 23 is the node determined by the destination determination unit 56 as described above. This completes the method for migrating the container.

According to the above-mentioned present embodiment, the container 31 determined to be vulnerable to the interference in the test environment is stored in the container information C in advance. Therefore, it is not necessary for the node 23 to determine the container 31 vulnerable to the interference while actually providing the service in the active environment, and the resources of the node 23 required for the determination can be saved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A method for determining a container to be migrated, the method is implemented by a first node, which operates as a physical server, executing a plurality of containers, the method comprising:
   determining a first container included in the plurality of the containers as the container to be migrated to a second node as a physical server; and
   migrating the first container from the first node to the second node via a network;
   wherein a plurality of containers in which a response time increases in a time zone in which a usage rate of a resource used by the first node increases, includes the first container and a second container each having an amount of usage of the resource in the time zone and an amount of data processing in the time zone that affects the increase in the response time,
   an increased amount of the usage of the resource and an increased amount of the data processing in the first container do not exceed predetermined values in the time zone, respectively, and
   an increased amount of the usage of the resource and an increased amount of the data processing in the second container exceed the predetermined values in the time zone, respectively.

2. The method for determining the container to be migrated as claimed in claim 1, wherein
   the determining of the first container is performed when a plurality of the time zones exist, where the response time increases in each of the time zones, and the increased amount of the usage of the resource and the increased amount of the data processing in the first container do not exceed the predetermined value in each of the time zones.

3. The method for determining the container to be migrated as claimed in claim 1, wherein the second node includes a plurality of second nodes, and the method further comprising:
   determining one of the second nodes as a destination node to which the first container is migrated, wherein the destination node has a smallest index among the second nodes, where the index indicates a degree to which the response time of each of the plurality of containers increases when the usage rate increases.

4. The method for determining the container to be migrated as claimed in claim 3, wherein
   all of the second nodes are notified of the index of the first node, and the first node and all of the second nodes other than one of the second nodes are notified of the index of the one of the second nodes.

5. The method for determining the container to be migrated as claimed in claim 3, wherein
a third node selected from any one of the first node and the second nodes receives notifications of the index from all of the first node and the second nodes, and
when the third node receives an inquiry from a fourth node selected from any one of the first node and the second nodes other than the third node, the third node notifies an answer of the inquiry to the fourth node, where the inquiry contains an information on which of the third node and the second nodes has a smallest value of the index.

6. The method for determining the container to be migrated as claimed in claim 3, wherein
the index is a value obtained by adding ratios of an increase amount of the response time to an increase amount of the usage rate for the plurality of the containers.

7. The method for determining the container to be migrated as claimed in claim 1, the method further comprising:
migrating the first container to the second node when the response time of the first container exceeds a threshold value.

8. The method for determining the container to be migrated as claimed in claim 1, the method further comprising:
monitoring the usage rate;
monitoring the response time, the increased amount of the usage of the resource in the time zone and the increased amount of the data processing in the time zone of each of the plurality of containers; and
determining the first container based on each of the usage rate, the response time, the increased amount of the usage of the resource in the time zone and the increased amount of the data processing in the time zone that are monitored.

9. The method for determining the container to be migrated as claimed in claim 1, the method further comprising:
referring an information identifying the first container; and
migrating the first container to the second node when the response time of the first container identified by the information exceeds a threshold value.

10. A non-transitory computer-readable medium having stored therein a program for causing a first node, which operates as a physical server, executing a plurality of containers to execute a process, the process comprising:
determining a first container included in the plurality of the containers as the container to be migrated to a second node as a physical server; and
migrating the first container from the first node to the second node via a network;
wherein a plurality of containers in which a response time increases in a time zone in which a usage rate of a resource used by the first node increases, includes the first container and a second container each having an amount of usage of the resource in the time zone and an amount of data processing in the time zone that affects the increase in the response time,
an increased amount of the usage of the resource and an increased amount of the data processing in the first container do not exceed predetermined values in the time zone, respectively, and
an increased amount of the usage of the resource and an increased amount of the data processing in the second container exceed the predetermined values in the time zone, respectively.

\* \* \* \* \*